US010893525B2

United States Patent
Noh et al.

(10) Patent No.: US 10,893,525 B2
(45) Date of Patent: *Jan. 12, 2021

(54) METHOD FOR TRANSMITTING AND RECEIVING CONTROL CHANNEL IN WIRELESS COMMUNICATION SYSTEMS

(71) Applicant: Electronics and Telecommunications Research Institute, Daejeon (KR)

(72) Inventors: Tae Gyun Noh, Daejeon (KR); Young Jo Ko, Daejeon (KR); Bang Won Seo, Daejeon (KR); Jae Young Ahn, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,306

(22) Filed: Apr. 30, 2019

(65) Prior Publication Data

US 2019/0261343 A1    Aug. 22, 2019

Related U.S. Application Data

(63) Continuation of application No. 14/986,292, filed on Dec. 31, 2015, now Pat. No. 10,327,247, which is a
(Continued)

(30) Foreign Application Priority Data

Jun. 21, 2011  (KR) .................. 10-2011-0060191
Aug. 16, 2011  (KR) .................. 10-2011-0081043
(Continued)

(51) Int. Cl.
*H04B 1/02*  (2006.01)
*H04W 72/04*  (2009.01)
(Continued)

(52) U.S. Cl.
CPC ......... *H04W 72/046* (2013.01); *H04L 5/0053* (2013.01); *H04L 5/0094* (2013.01);
(Continued)

(58) Field of Classification Search
CPC ...... H04W 72/02; H04W 72/04; H04W 72/05
See application file for complete search history.

(56) References Cited

U.S. PATENT DOCUMENTS 7,885,176 B2 *  2/2011  Pi .................... H04L 5/0046
                                                        370/204
7,941,151 B2     5/2011  Rudolf et al.
(Continued)

FOREIGN PATENT DOCUMENTS

KR   1020100082774 A   3/2011
WO      2011038644 A1   4/2011

OTHER PUBLICATIONS

U.S. Appl. No. 61/358,644, filed Jun. 25, 2010 (Year: 2010).
(Continued)

*Primary Examiner* — Sithu Ko

(57) ABSTRACT

A method of transmitting and receiving a control channel in a wireless communication system is provided. A base station allocates a data channel to a radio resource, adds start position information of the data channel into a payload of a control channel, and performs signaling for indication information on the start position information added into the payload of the control channel to a terminal. Accordingly, the legacy system and the enhanced system can efficiently transmit a control channel.

18 Claims, 15 Drawing Sheets

Related U.S. Application Data continuation of application No. 13/529,310, filed on Jun. 21, 2012, now Pat. No. 10,009,896.

(30) Foreign Application Priority Data

| Aug. 29, 2011 | (KR) | ........................ 10-2011-0086737 |
| Oct. 10, 2011 | (KR) | ........................ 10-2011-0102910 |
| Jan. 31, 2012 | (KR) | ........................ 10-2012-0009514 |

(51) Int. Cl.
  *H04L 5/00* (2006.01)
  *H04W 4/20* (2018.01)

(52) U.S. Cl.
  CPC ........... *H04W 4/20* (2013.01); *H04W 72/042* (2013.01); *H04W 72/0406* (2013.01)

(56) References Cited

U.S. PATENT DOCUMENTS

| 8,767,611 | B2* | 7/2014 | Bi ........................ H04L 5/0053 |
| | | | 370/315 |
| 8,824,405 | B2 | 9/2014 | Moon et al. |
| 8,867,548 | B2* | 10/2014 | Ahn ...................... H04L 1/1861 |
| | | | 370/394 |
| 8,902,802 | B2* | 12/2014 | Park ...................... H04L 5/0098 |
| | | | 370/311 |
| 8,937,913 | B2 | 1/2015 | Kim |
| 9,131,490 | B2* | 9/2015 | Feng ...................... H04L 5/0048 |
| 9,185,658 | B2* | 11/2015 | Lee ........................ H04W 52/42 |
| 9,877,334 | B2* | 1/2018 | Dinan .................. H04W 72/121 |
| 9,961,676 | B2* | 5/2018 | Wang .................. H04W 72/042 |
| 10,111,211 | B2* | 10/2018 | Yu ......................... H04L 5/0053 |
| 10,454,743 | B2* | 10/2019 | Chae ...................... H04W 52/54 |
| 2008/0089281 | A1 | 4/2008 | Yoon et al. |
| 2009/0135752 | A1 | 5/2009 | Su et al. |
| 2009/0323625 | A1 | 12/2009 | Lee et al. |
| 2010/0020716 | A1 | 1/2010 | Kuchibhotla et al. |
| 2010/0238821 | A1 | 9/2010 | Liu et al. |
| 2010/0254268 | A1* | 10/2010 | Kim ........................ H04L 5/001 |
| | | | 370/241 |
| 2010/0254295 | A1 | 10/2010 | Ann et al. |
| 2010/0265870 | A1 | 10/2010 | Cai et al. |
| 2010/0265911 | A1 | 10/2010 | Wu et al. |
| 2011/0021224 | A1 | 1/2011 | Koskinen et al. |
| 2011/0038285 | A1 | 2/2011 | Kwon et al. |
| 2011/0070891 | A1 | 3/2011 | Nishio et al. |
| 2011/0075624 | A1 | 3/2011 | Papasakellariou |
| 2011/0141927 | A1 | 6/2011 | Luo et al. |
| 2011/0150134 | A1 | 6/2011 | Yoo et al. |
| 2011/0170496 | A1 | 7/2011 | Fong et al. |
| 2011/0228722 | A1 | 9/2011 | Noh et al. |
| 2011/0275363 | A1 | 11/2011 | Kwon et al. |
| 2011/0299449 | A1 | 12/2011 | Kwon et al. |
| 2011/0317645 | A1* | 12/2011 | Jen ........................ H04W 52/60 |
| | | | 370/329 |
| 2012/0020323 | A1 | 1/2012 | Noh et al. |
| 2012/0033603 | A1 | 2/2012 | Seo et al. |
| 2012/0039232 | A1 | 2/2012 | Kwon et al. |
| 2012/0044826 | A1 | 2/2012 | Wang et al. |
| 2012/0120888 | A1 | 5/2012 | Miao et al. |
| 2012/0147810 | A1 | 6/2012 | Wang et al. |
| 2012/0163334 | A1* | 6/2012 | Miki ...................... H04L 5/0053 |
| | | | 370/330 |
| 2012/0201191 | A1 | 8/2012 | Seo et al. |
| 2012/0230290 | A1 | 9/2012 | Seo et al. |
| 2012/0263127 | A1 | 10/2012 | Moon et al. |
| 2012/0269140 | A1 | 10/2012 | Nam et al. |
| 2012/0281564 | A1 | 11/2012 | Zhang et al. |
| 2012/0282936 | A1 | 11/2012 | Gao et al. |
| 2012/0287836 | A1 | 11/2012 | Lee et al. |
| 2012/0320846 | A1 | 12/2012 | Papasakellariou et al. |
| 2012/0320848 | A1 | 12/2012 | Chen et al. |
| 2012/0327894 | A1 | 12/2012 | Axmon et al. |
| 2013/0003604 | A1 | 1/2013 | Blankenship et al. |
| 2013/0094456 | A1 | 4/2013 | Ng |
| 2013/0128835 | A1 | 5/2013 | Bolourchi et al. |
| 2013/0136048 | A1 | 5/2013 | Cho et al. |
| 2013/0223402 | A1 | 8/2013 | Feng et al. |
| 2013/0230013 | A1 | 9/2013 | Seo et al. |
| 2014/0010190 | A1 | 1/2014 | Seo et al. |
| 2014/0036849 | A1 | 2/2014 | Riberio et al. |
| 2014/0293924 | A1* | 10/2014 | Wang .................. H04W 72/042 |
| | | | 370/329 |

OTHER PUBLICATIONS

U.S. Appl. No. 13/529,310, filed Jun. 21, 2012 (now U.S. Patent No. 10,009,896).
U.S. Appl. No. 14/986,292, filed Dec. 31, 2015.
Non-final Office Action dated (Jan. 28, 2014) for U.S. Appl. No. 13/529,310.
Non-final Office Action (dated Nov. 17, 2014) for U.S. Appl. No. 13/529,310.
Final Office Action (dated May 15, 2015) for U.S. Appl. No. 13/529,310.
Non-final Office Action (dated Oct. 13, 2016) for U.S. Appl. No. 13/529,310.
Final Office Action (dated Jul. 7, 2017) for U.S. Appl. No. 13/529,310.
Notice of Allowance (dated Oct. 2, 2015) for U.S. Appl. No. 13/529,310.
Notice of Allowance (dated Nov. 3, 2015) for U.S. Appl. No. 13/529,310.
Notice of Allowance (dated Nov. 12, 2015) for U.S. Appl. No. 13/529,310.
Notice of Allowance (dated Nov. 25, 2015) for U.S. Appl. No. 13/529,310.
Notice of Allowance (dated Apr. 6, 2018) for U.S. Appl. No. 13/529,310.
Non-final Office Action (dated Jun. 22, 2016) for U.S. Appl. No. 14/986,292.
Final Office Action (dated Mar. 23, 2017) for U.S. Appl. No. 14/986,292.
Non-final Office Action (dated Jan. 30, 2018) for U.S. Appl. No. 14/986,292.
Final Office Action (dated Jul. 23, 2018) for U.S. Appl. No. 14/986,292.
Notice of Allowance (dated Jan. 31, 2019) for U.S. Appl. No. 14/986,292.

\* cited by examiner

FIG. 13
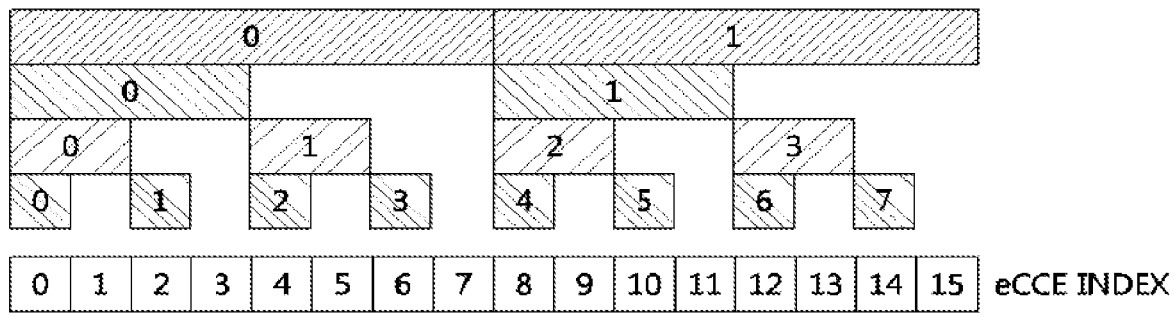
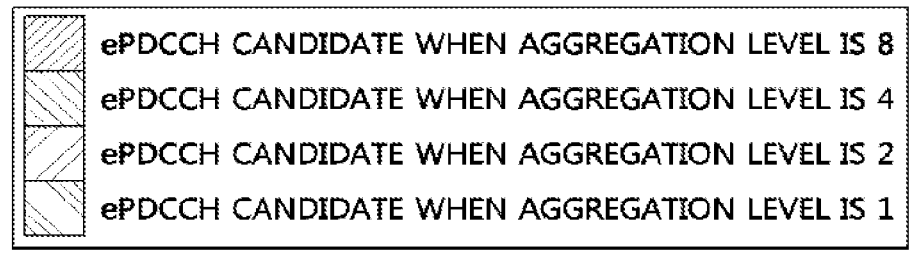
FIG. 14
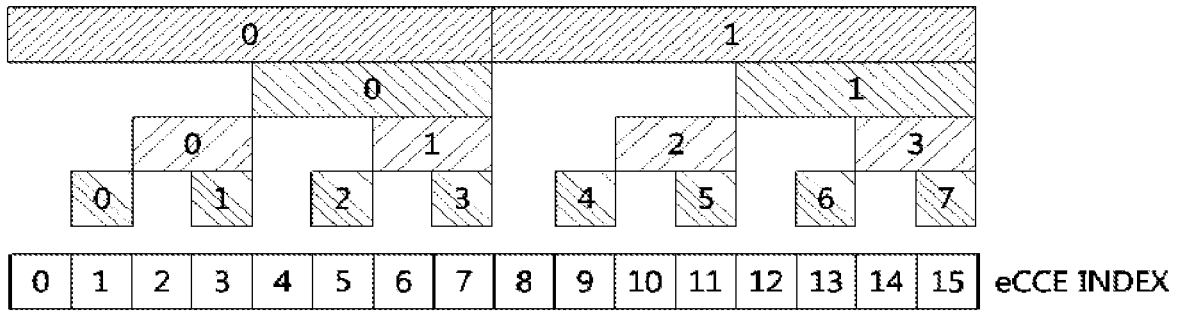
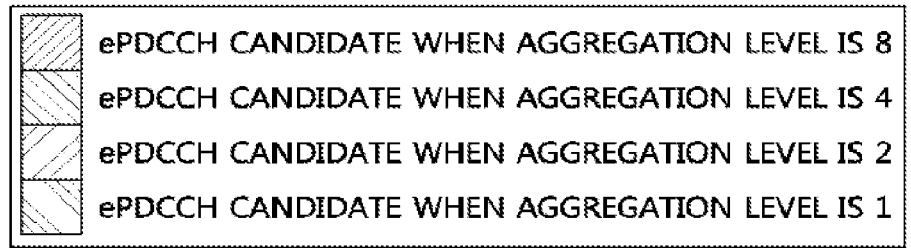

FIG. 17
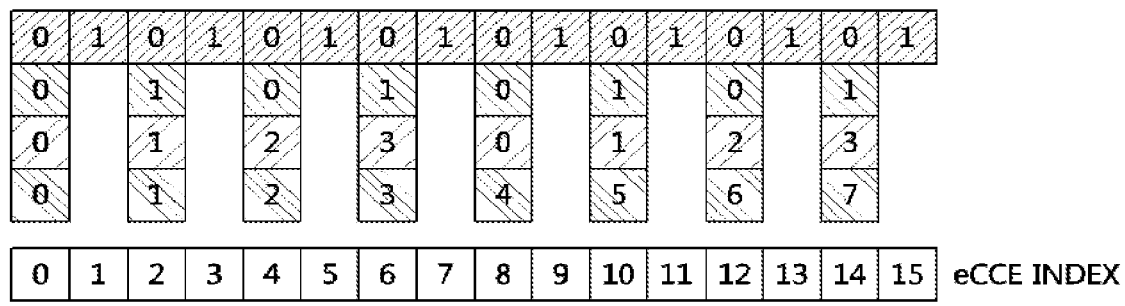
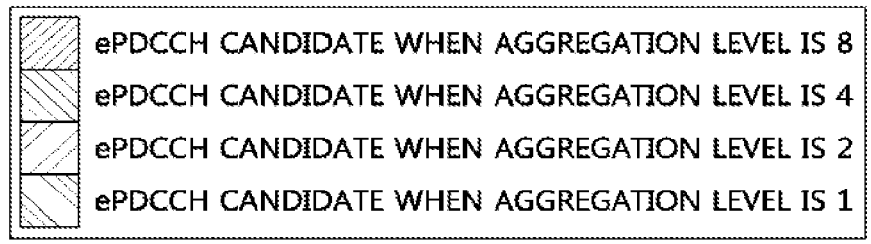
FIG. 18
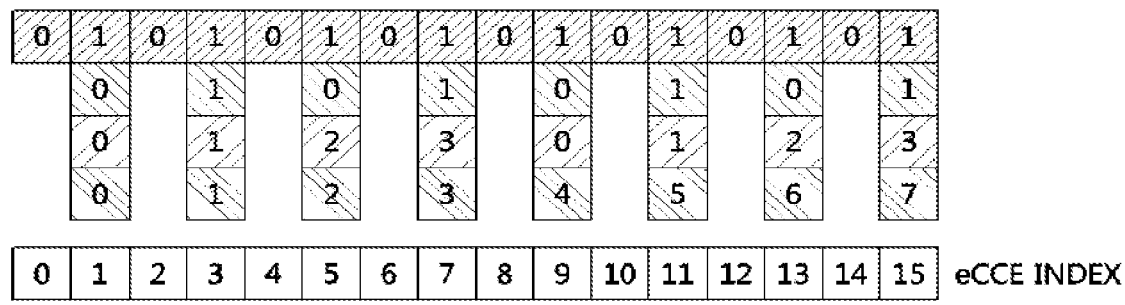
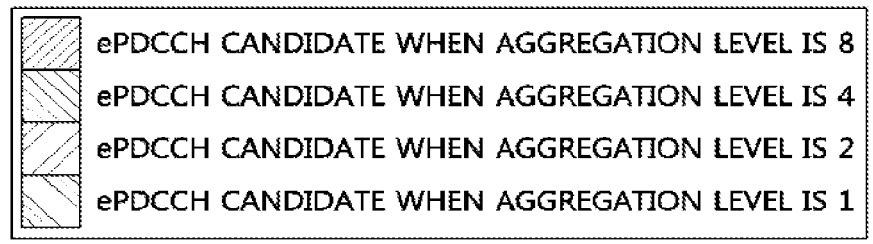

METHOD FOR TRANSMITTING AND RECEIVING CONTROL CHANNEL IN WIRELESS COMMUNICATION SYSTEMS

CROSS-REFERENCE TO RELATED APPLICATIONS

This application is a continuation of U.S. application Ser. No. 14/986,292, filed on Dec. 31, 2015, which is a continuation of U.S. application Ser. No. 13/529,310, filed Jun. 21, 2012 (now U.S. Pat. No. 10,009,896), which claims priority to Korean Patent Application Nos. 10-2011-0060191 filed on Jun. 21, 2011, 10-2011-0081043 filed on Aug. 16, 2011, 10-2011-0086737 filed on Aug. 29, 2011, 10-2011-0102910 filed on Oct. 10, 2011, and 10-2012-0009514 filed on Jan. 31, 2012, in the Korean Intellectual Property Office (KIPO), the entire contents of which are hereby incorporated by reference.

BACKGROUND

1. Technical Field

Example embodiments of the present invention relate in general to a wireless communication system, and more specifically to a method of transmitting and receiving a control channel in a wireless communication system.

2. Related Art

A data transmission rate in wireless communication systems and wired communication systems has recently become very high. In line with this trend, the $3^{rd}$ generation project partnership long term evolution (3GPP LTE) system and the LTE-advanced system are presently undergoing standardization.

In the 3GPP LTE system, downlink transmission is based on orthogonal frequency division multiplexing (OFDM), and uplink transmission is based on single frequency-frequency division multiple access (SC-FDMA).

That is, the 3GPP system uses time-frequency resources as fundamental physical resources, and each resource element corresponds to one OFDM subcarrier during one OFDM symbol period. Also, downlink subcarriers are grouped into a plurality of resource blocks in a frequency domain, and each of the resource blocks consists of twelve successive subcarriers.

In the 3GPP LTE system, the physical downlink shared channel (PDSCH) is used as a physical channel for transmitting downlink unicast data, and the physical uplink shared channel (PUSCH) is used as a downlink physical data channel for transmitting uplink data. Also, the physical downlink control channel (PDCCH) is used as a downlink physical control channel for transmitting downlink control information, such as scheduling necessary for receiving the PDSCH, and scheduling approval for transmission in the PUSCH. The downlink physical data channel and the downlink physical control channel are mapped in units of subframes comprising time-frequency resources.

When a data channel and a control channel are multiplexed in one subframe, a base station provides start position information of the data channel in a time domain, for which an efficient method is required.

Moreover, when the enhanced PDCCH (ePDCCH) allocated to a data channel region of a subframe is introduced, an efficient control channel transmission method is necessary for both an enhanced system capable of transmitting/ receiving the ePDCCH and a legacy system incapable of transmitting/receiving the ePDCCH.

SUMMARY

Accordingly, example embodiments of the present invention are provided to substantially obviate one or more problems due to limitations and disadvantages of the related art.

Example embodiments of the present invention provide a method of efficiently transmitting and receiving a control channel in a wireless communication system.

In some example embodiments, a method of transmitting and receiving a control channel includes: allocating a data channel to a radio resource; adding start position information of the data channel into a payload of a control channel; and signaling indication information on the start position information added into the payload of the control channel.

The adding of start position information may include defining a bit field for the start position information in the payload, and adding the start position information into the bit field.

The adding of start position information may include adding the start position information into an unused bit field among bit fields of the payload.

The adding of start position information may include inserting a CRC value, which is obtained by applying a predefined mask value to CRC of the payload, into the payload according to the start position information.

The adding of start position information may include inserting a result of performing a modulo operation using the predefined mask value, an ID of a terminal, and the CRC of the payload, into the payload according to the start position information.

The data transmission apparatus may not allocate at least one ID equal to a quantity of start position information to another terminal such that the CRC values of the terminal and the other terminal do not overlap.

The adding of start position information may include: additionally allocating different temporary IDs to a terminal according to the start position information; calculating a CRC value corresponding to the start position information by using the additionally allocated temporary IDs; and inserting the calculated CRC value into the payload.

A temporary ID first allocated to the terminal may indicate specific start position information, and the start position information may be predefined between the base station and the terminal.

The adding of start position information may include applying different scrambling sequences to the payload of the control channel according to the start position information.

Each of the scrambling sequences may be generated on the basis of different sequence initial values that are predefined between the data transmission apparatus and a terminal according to the start position information.

In other example embodiments, a method of transmitting and receiving a control channel in a wireless communication system, including a plurality of data transmission apparatuses, includes: transmitting, by at least one first data transmission apparatus, a data channel to a terminal; and transmitting, by a second data transmission apparatus, a control channel to the terminal, wherein the second data transmission apparatus transmits MBSFN subframe information as information on the at least one first data transmission apparatus.

The transmitting of a control channel may include: defining, by the second data transmission apparatus, a bit field for the MBSFN subframe information in a payload of the control channel; and adding, by the second data transmission apparatus, bitmap information into the bit field, the bitmap information indicating whether the at least one first data transmission apparatus includes MBSFN subframe information.

In still other example embodiments, a control channel transmission and reception method for transmitting an enhanced downlink physical control channel, which is added into a section of a downlink physical data channel and transmitted, includes: allocating at least one downlink demodulation reference signal to a first symbol other than a second symbol to which a downlink cell-specific reference signal has been allocated, in a subframe, the first symbol being included in an frequency domain to which at least one control channel element configuring the enhanced downlink physical control channel has been allocated; and transmitting the subframe.

The allocating of at least one downlink demodulation reference signal may include allocating a control channel element instead of the downlink cell-specific reference signal to the frequency domain to which the at least one control channel element has been allocated, when the subframe is an MBSFN subframe.

In still other example embodiments, a control channel transmission and reception method of a data transmission apparatus includes: configuring a search space in which an enhanced downlink physical control channel candidate consists of adjacent control channel elements (CCEs), in at least one aggregation level, the enhanced downlink physical control channel denoting a physical control channel that is added into a downlink physical data channel region and transmitted; and providing information of the configured search space to a terminal.

The configuring of a search space may include: allocating different enhanced downlink physical control channel candidates by aggregation level; setting a CCE-unit offset between the enhanced downlink physical control channel candidates by aggregation level; and setting a CCE-unit offset for each terminal by aggregation level.

In still other example embodiments, a data channel transmission and reception method of a data transmission apparatus includes: configuring a search space by configuring an enhanced downlink physical control channel candidate with distributed control channel elements (CCEs), in at least one aggregation level, the enhanced downlink physical control channel denoting a physical control channel that is added into a downlink physical data channel region and transmitted; and providing information of the configured search space to a terminal.

The configuring of a search space may include setting a CCE-unit offset between the at least one CCE configuring the enhanced downlink physical control channel candidate.

In still other example embodiments, a control channel transmission and reception method of a data transmission apparatus includes: determining a kind of a control channel for transmitting control information and a transmission type of the control channel according to whether to enable reception of an enhanced downlink physical control channel and fallback control information and control information based on a physical data transmission mode, the enhanced downlink physical control channel denoting a physical control channel that is added into a downlink physical data channel region and transmitted; and configuring a control channel on the basis of the determined kind and transmission type of the control channel.

The determining of a kind of a control channel may include: determining one of a downlink physical control channel and the enhanced downlink physical control channel as the kind of the control channel; and determining one of a localized type, in which a search space is configured for control channel elements of the control channel to be adjacent, and a distributed type, in which a search space is configured for the control channel elements to be distributed, as the transmission type of the control channel.

According to the methods of transmitting and receiving a control channel in the wireless communication system, provided are various methods that provide the start position information of the data channel by using the allocation information control channel. Also, provided are various methods of configuring an enhanced downlink physical control channel, and provided are a search space configuration method for a legacy system and an enhanced system and a method of transmitting control information that is transmitted through a search space.

Therefore, base stations and terminals can effectively transmit and receive a control channel in both an enhanced system with an enhanced downlink physical control channel applied thereto and a legacy system to which the enhanced downlink physical control channel is not applied.

BRIEF DESCRIPTION OF DRAWINGS

Example embodiments of the present invention will become more apparent by describing in detail example embodiments of the present invention with reference to the accompanying drawings, in which:

FIG. 13 is a diagram illustrating another configuration example of a localized type search space applied to the method of transmitting and receiving a control channel according to an embodiment of the present invention;

FIG. 14 is a diagram illustrating another configuration example of a localized type search space applied to the method of transmitting and receiving a control channel according to an embodiment of the present invention;

FIG. 17 is a diagram illustrating another configuration example of a distributed type search space applied to the method of transmitting and receiving a control channel according to an embodiment of the present invention; and FIG. 18 is a diagram illustrating another configuration example of a distributed type search space applied to the method of transmitting and receiving a control channel according to an embodiment of the present invention.

DESCRIPTION OF EXAMPLE EMBODIMENTS

Figure 1:
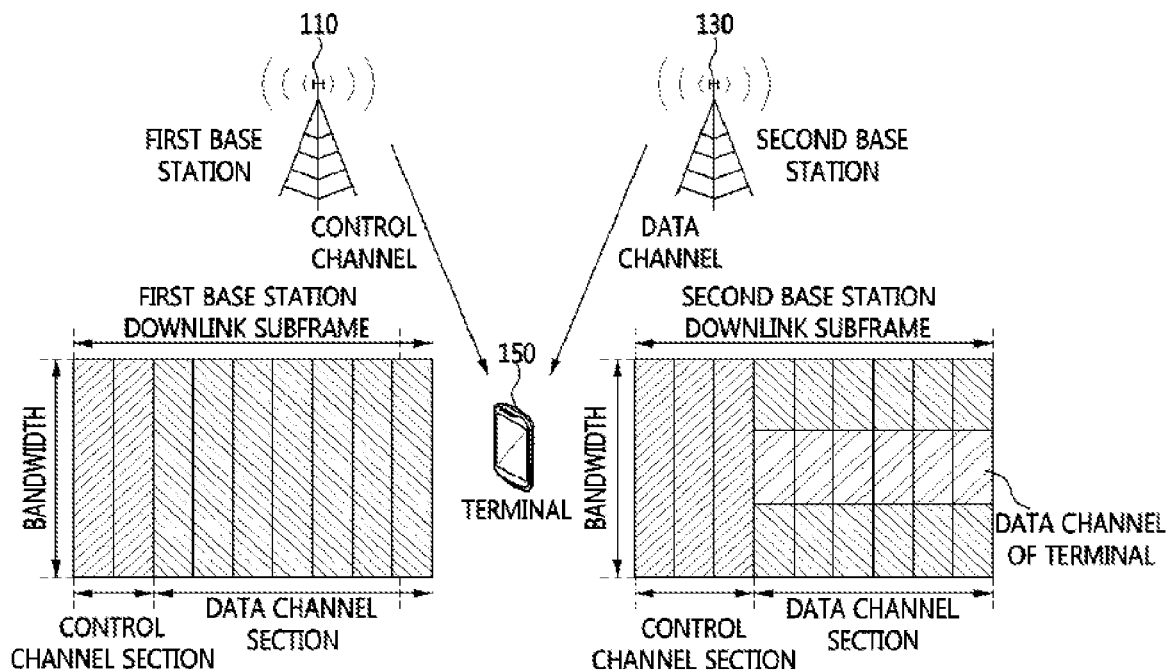
FIG. 1 is a conceptual diagram illustrating an example of a wireless communication environment in which it is necessary to explicitly transmit start position information.

The invention may have diverse modified embodiments, and thus, example embodiments are illustrated in the drawings and are described in the detailed description of the invention.

However, this does not limit the invention within specific embodiments and it should be understood that the invention covers all the modifications, equivalents, and replacements within the idea and technical scope of the invention. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A terminal used in the specification may refer to user equipment (UE), a mobile station (MS), a relay node (RN), a machine type communication (MTC) device, a mobile terminal (MT), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or something else.

Moreover, a base station used in the specification denotes a control apparatus that controls one cell. However, a physical base station may actually control a plurality of cells in a wireless communication system, in which case the physical base station may be regarded as including one or more base stations used in the specification. For example, in the specification, different parameters being allocated to a plurality of cells should be understood as respective base stations allocating different values to the cells. Also, the base station used in the specification may be called by other names such as a base station, a node-B, an eNode-B, a base transceiver system (BTS), an access point, a transmission point, etc.

Hereinafter, example embodiments of the invention will be described in detail with reference to the accompanying drawings. In describing the invention, to facilitate a comprehensive understanding of the invention, like numbers refer to like elements throughout the description of the figures, and descriptions of elements are not repeated.

The 3GPP LTE system and the LTE-advanced system use a time domain structure that is configured with a frame including ten subframes with a length of 1 ms.

When a data channel and a control channel are multiplexed in one subframe, in order for a terminal to demodulate a received data channel, a base station needs to provide start position information of the data channel to the terminal in a time domain.

The terminal may demodulate the data channel by using the start position information received from the base station. Here, for example, the start position information may be an index of a symbol configuring a subframe, and the symbol may be an OFDM symbol or an SC-FDMA symbol.

A method in which a base station transmits start position information to a terminal may be categorized into an implicit method and an explicit method.

The implicit method is a method in which a base station indirectly transmits start position information through a control channel section, and requires that a data channel is transmitted from a symbol just next to the control channel section. For example, in the 3GPP system, a terminal may receive the physical control format indicator channel (PCFICH), received from a base station, to determine a control channel section of the base station.

When a plurality of base stations simultaneously transmit a data channel for a specific terminal, a specific one of the base stations may transmit information on the base stations that transmit the data channel to the terminal. Here, information on the base stations may include an identifier (ID) of each of the base stations and reference signal information of each base stations. For example, in the 3GPP system, a base station ID may be a physical cell ID (PCI), and the reference signal information may be the number of cell-specific reference signal (CRS) antennas or ports.

The terminal may determine a control channel section of each base station that participates in transmission of the data channel, on the basis of the information on the base stations that transmit the data channel received from the specific base station. Also, the terminal may determine a control channel section of a base station that transmits a control channel. On the assumption that a data channel allocated to the terminal is transmitted from a symbol just next to a control channel section that has the greatest value among the control channel section of the base station transmitting the control channel, the terminal may demodulate the data channel. Here, the base station that transmits the control channel to the terminal may or may not transmit the data channel. In the 3GPP system, the terminal may receive the PCFICH transmitted from the base station to determine the control channel section of the base station.

Unlike an implicit method, in an explicit method, a base station directly transmits start position information to a terminal. In a wireless communication system, when the implicit method and the explicit method are simultaneously used, priority higher than that of the implicit method may be given to the explicit method.

A base station transmits a data channel from the same start position as that of start position information that is transmitted via the explicit method. A terminal demodulates the data channel on the basis of the explicitly transmitted start position information.

The explicit method may be categorized into a semi-static signaling method and a dynamic signaling method.

The semi-static signaling method is a method in which a base station transmits start position information to a terminal through semi-static signaling, and particularly, when the start position information is not changed for a certain time, the semi-static signaling method is useful. For example, in the 3GPP system, the semi-static signaling method may allow a base station to transmit start position information to a terminal through high layer signaling or radio resource control (RRC) signaling.

The dynamic signaling method is a method in which a base station transmits start position information to a terminal through a control channel that is used to transmit allocation information of a data channel, and when the start position information is changed for each subframe, the dynamic signaling method is useful. Hereinafter, the control channel for transmitting the allocation information of the data channel is referred to as an allocation information control channel. For example, in the 3GPP system, the allocation information control channel may be the PDCCH.

A base station may allocate a control channel and a data channel to a subframe, and transmit start position information through the allocation information control channel. Hereinafter, a method of transmitting start position information through the allocation information control channel in the method of transmitting and receiving a control channel according to an embodiment of the present invention will be described.

A first method includes defining a bit field representing start position information in a payload of the allocation information control channel. Here, the payload of the allocation information control channel denotes a state before channel coding is applied. The bit size of the bit field may vary according to a quantity of start position information.

A base station adds start position information into the bit field that is defined in the payload of the allocation information control channel, and transmits the start position information with the bit field added thereto to a terminal. Also, the base station may transmit semi-static signaling, which indicates whether the payload of the allocation information control channel includes the bit field representing the start position information, to the terminal. The terminal varies the size of the payload of the allocation information control channel to demodulate the allocation information control channel according to the semi-static signaling received from the base station.

A second method involves using a bit field, which is defined for some other use in the payload of the allocation information control channel, as start position information. In a specific condition, at least one bit field may not be used, and thus may be reused as start position information.

A base station adds start position information into a bit field that is not used in the payload of the allocation information control channel, and transmits the start position information with the bit field added thereto to a terminal. Also, the base station may transmit semi-static signaling, which indicates whether the bit field (which is defined for some other use in the payload of the allocation information control channel) is to be used as the start position information, to the terminal. The terminal demodulates the allocation information control channel on the basis of the semi-static signaling received from the base station.

In a third method, a predefined mask is applied differently to cyclic redundancy check (CRC) of the payload of the allocation information control channel according to start position information. Here, the number of predefined masks may vary according to a quantity of start position information. An embodiment of the third method may be expressed as Equation (1).

$$c_k = (p_k + x_k^{RNTI} + x_k^{SS}) \bmod 2, k=0,1,\ldots,L-1 \quad (1)$$

where $p_k$ denotes CRC of the payload of the allocation information control channel, L denotes a CRC length, and $x_k^{RNTI}$ denotes a temporary ID (radio network temporary identifier (RNTI) of a terminal. As an example, in the 3GPP system, the temporary ID of the terminal may be a cell RNTI (C-RNTI), a semi-persistent scheduling C-RNTI (SPS C-RNTI), or a temporary C-RNTI, and one terminal may have all of the C-RNTI, the SPS C-RNTI, and the temporary C-RNTI. $x_k^{SS}$ denotes a CRC mask based on start position information, and $c_k$ denotes a CRC mask result value.

In Equation 1, $x_k^{RNTI}$ is included as one parameter for applying the CRC mask, in the CRC mask, but in another embodiment of the present invention, $x_k^{RNTI}$ may not be included in the CRC mask of the payload of the allocation information control channel. Also, in another embodiment of the present invention, a mask that is not expressed in Equation (1) may be additionally added into the CRC mask of the payload of the allocation information control channel.

As a detailed example in which Equation (1) is applied, when the CRC length is defined as 16 (i.e., L=16), the CRC mask based on the start position information may be indicated as Table 1 or Table 2. In Table 1 or Table 2, the start position information is expressed as 1, 2, and 3 as an example, but the start position information and the CRC mask are not limited to Table 1 or Table 2.

TABLE 1

| Start position information | CRC mask of start position information $<x_0^{SS}, x_1^{SS}, x_2^{SS}, \ldots, x_{15}^{SS}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 3 | <0, 1, 0, 1, 0, 1, 0, 1, 0, 1, 0, 1, 0, 1, 0, 1> |

TABLE 2

| Start position information | CRC mask of start position information $<x_0^{SS}, x_1^{SS}, x_2^{SS}, \ldots, x_{15}^{SS}>$ |
|---|---|
| 1 | <0, 0, 0, 0, 0, 0, 0, 0, 0, 0, 0, 0, 0, 0, 0, 0> |
| 2 | <0, 0, 0, 0, 0, 0, 0, 0, 0, 0, 0, 0, 0, 0, 0, 1> |
| 3 | <0, 0, 0, 0, 0, 0, 0, 0, 0, 0, 0, 0, 0, 0, 1, 0> |

In Equation (1), a modulo operation is performed with the CRC mask (corresponding to the start position information) and the temporary ID of the terminal. When a modulo operation result of a CRC mask of arbitrary start position information and a temporary ID of a specific terminal is equal to a modulo operation result of the CRC mask of the arbitrary start position information and a temporary ID of another terminal, a plurality of terminals can recognize an allocation information control channel for one specific terminal as their allocation information control channels.

To prevent such a drawback, a base station needs to allocate a temporary ID to a terminal such that a modulo operation result of a temporary ID allocated to a specific terminal and a CRC mask of arbitrary start position information differs from a modulo operation result of a temporary ID of another terminal and the CRC mask of the arbitrary start position information.

That is, although a base station actually allocates only one temporary ID to a terminal, the base station does not allocate temporary ID(s) equal to "a quantity of start position information—1" to other terminals but rather reserves the temporary IDs. This denotes that a base station virtually allocates temporary ID(s) equal to a quantity of start position information. For example, as shown in Table 1 and Table 2, when a quantity of start position information is three, a base station actually allocates one temporary ID to a specific terminal, and reserves two temporary IDs without allocating the two temporary IDs to other terminals, thereby virtually allocating three temporary IDs to the specific terminal.

A base station may or may not use the explicit method for transmitting start position information to a terminal. The base station does not use a CRC mask of the start position information for a terminal that uses only the implicit method without using the explicit method. Therefore, the base station needs to reserve temporary IDs that are not allocated to another terminals. That is, it may be considered that the base station actually and virtually allocates only one temporary ID to the terminal.

Moreover, the base station may divide a plurality of temporary IDs into two groups, for efficiently using the temporary IDs. One of the two groups is a temporary ID group for terminals using the explicit method and is a group (hereinafter referred to as a first group) that actually allocates only one temporary ID but virtually allocates temporary IDs equal to a quantity of start position information. The other of the two groups is a temporary ID group for terminals using only the implicit method, and is a group (hereinafter referred to as a second group) that actually or virtually allocates only one temporary ID.

When the base station intends to allocate a temporary ID to a terminal for the first time, the base station cannot determine whether the terminal uses the explicit method or uses only the implicit method. Therefore, the base station allocates a temporary ID of the first or second group to the terminal. At this point, the temporary ID of the second group may be allocated to a terminal using the explicit method, and the temporary ID of the first group may be allocated to a terminal using only the implicit method.

When the temporary ID of the second group is first allocated to the terminal using the explicit method, a plurality of terminals can recognize an allocation information control channel for one specific terminal as their allocation information control channels.

To prevent such a drawback, the base station knows whether the terminal uses the explicit method or the implicit method, and when the temporary ID of the second group is first allocated to the terminal using the explicit method, the base station may change the allocated temporary ID to the temporary ID of the first group.

Alternatively, when the number of temporary IDs of the first group is insufficient, when the temporary ID of the first group is first allocated to the terminal using only the implicit method, the base station may change the temporary ID (which is first allocated to the terminal using only the implicit method) to the temporary ID of the first group.

In a fourth method, a base station additionally allocates different temporary IDs according to start position information, calculates a CRC value with the additionally allocated temporary IDs, and inserts the CRC value into the payload of the allocation information control channel. The number of temporary IDs which are additionally allocated by the base station may vary based on a quantity of start position information.

The base station and a terminal may predefine start position information. A temporary ID that the base station allocates to the terminal may be predefined as indicating specific start position information. Subsequently, the base station may additionally allocate a temporary ID indicating other start position information to a terminal using the explicit method. An embodiment of the fourth method may be expressed as Equation (2).

$$c_k = (p_k + x_k^{RNTI,n}) \bmod 2, k=0,1,\ldots,L-1 \qquad (2)$$

where $p_k$ denotes CRC of the payload of the allocation information control channel, L denotes a CRC length, $c_k$ denotes a CRC mask result value, and $x_k^{RNTI,n}$ denotes a temporary ID of a terminal based on start position information. In an embodiment of the present invention, when it is assumed that start position information which a base station and a terminal have predefined is 1, 2, and 3, the temporary ID of the terminal based on start position information may be expressed as in Table 3, for example. A temporary ID "$x_{RNTI,0}$" that the base station first allocates to the terminal may be predefined as being used to indicate first start position information. Subsequently, the base station may additionally allocate temporary IDs "$x_k^{RNTI,1}$" and "$x_k^{RNTI,2}$" indicating the other start position information "2" and "3" to terminals using the explicit method.

TABLE 3

| Start position information | Temporary ID |
|---|---|
| 1 | $x_k^{RNTI,0}$ |
| 2 | $x_k^{RNTI,1}$ |
| 3 | $x_k^{RNTI,2}$ |

In Table 3, the start position information is expressed as 1, 2, and 3 as an example, but the start position information and the temporary IDs corresponding thereto are not limited to Table 3.

In a fifth method, a base station applies different scrambling sequences to the payload of the allocation information control channel according to start position information. The number of scrambling sequences may vary according to a quantity of start position information. Here, each of the scrambling sequences may be generated by changing a sequence initial value in the same sequence according to the start position information. Also, the scrambling sequences may use different predefined sequences according to the start position information. An embodiment of the fifth method may be expressed as Equation (3).

$$b_k = (a_k + s_k) \bmod 2, k = 0, 1, \ldots, A-1 \quad (3)$$

where $a_k$ denotes the payload of the allocation information control channel, A denotes a payload length of the allocation information control channel, $s_k$ denotes a scrambling sequence, and $b_k$ denotes a result value that is obtained by scrambling the payload of the allocation information control channel. CRC of the payload of the allocation information control channel may be generated for the scrambled result value.

When one base station transmits a data channel and a control channel to a terminal, start position information may be transmitted in only the implicit method. However, when a base station that transmits the data channel to the terminal differs from a base station that transmits the control channel to the terminal, the start position information transmitted via the implicit method can be inaccurate.

FIG. 1 is a conceptual diagram illustrating an example of a wireless communication environment in which it is necessary to explicitly transmit start position information. FIG. 1, for example, illustrates a case in which a base station transmitting the data channel differs from a base station transmitting the control channel.

In FIG. 1, a first base station 110 transmits a control channel to a terminal 150, and a second base station 130 transmits a data channel to the terminal 150.

The control channel of the first base station 110 transmitting the control channel consists of two symbols, but the control channel of the second base station 130 transmitting the data channel consists of three symbols.

In an environment that is as illustrated in FIG. 1, when a base station transmits start position information via the implicit method, the terminal 150 performs demodulation, on the assumption that a data channel starts from the third symbol of a subframe on the basis of the control channel of the first base station 110.

However, an actual data channel starts from the fourth symbol of the subframe, and thus, it is quite possible that the terminal 150 fails to demodulate the data channel.

Accordingly, in the environment of FIG. 1, a base station may transmit start position information via the explicit method, for transmitting accurate start position information to the terminal 150.

Figure 2:
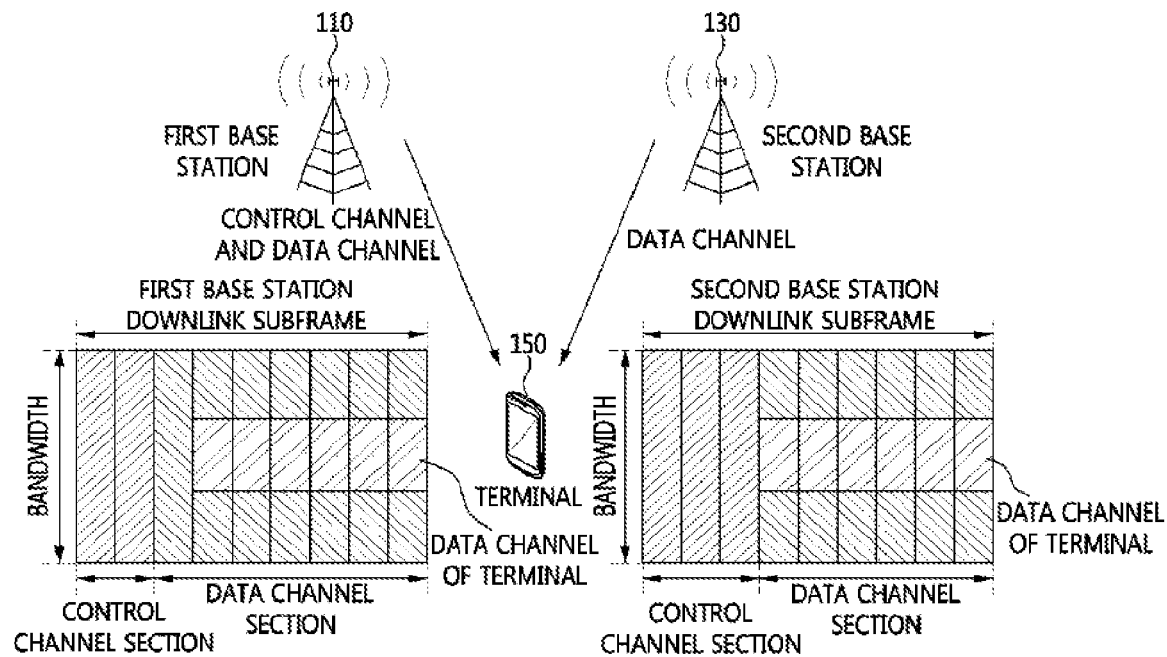
FIG. 2 is a conceptual diagram illustrating another example of a wireless communication environment in which it is necessary to explicitly transmit start position information.

FIG. 2 is a conceptual diagram illustrating another example of a wireless communication environment in which it is necessary to explicitly transmit start position information, and as an example, illustrates a case in which a plurality of base stations 110 and 130 transmit a data channel to a terminal 150, and one base station 110 transmits a control channel to the terminal 150.

When a plurality of base stations transmit a data channel to the terminal 150 and one base station transmits a control channel to the terminal 150, the transmission of start position information via the implicit method may be inaccurate.

In FIG. 2, the first base station 110 transmits a control channel and a data channel to the terminal 150, and the second base station 130 transmits a data channel to the terminal 150. The first and second base stations 110 and 120 need to transmit the data channel to the terminal 150 by using the same resource, and thus transmit the data channel from the fourth symbol of a subframe with respect to the control channel section of the second base station 130 having the longer control channel section of the control channel sections of the first and second base stations 110 and 130.

However, the control channel of the first base station 110 transmitting the control channel consists of two symbols, and thus, when the first base station 110 transmits start position information via the implicit method, the terminal performs demodulation on the assumption that the data channel starts from the third symbol. On the other hand, an actual data channel starts from the fourth symbol, and thus, the terminal 150 mostly fails to demodulate the data channel.

Accordingly, in the environment of FIG. 2, a base station may transmit start position information via the explicit method, for transmitting accurate start position information to the terminal 150.

An environment that requires the implicit method or the explicit method for transmitting start position information is a wireless communication environment in the above-described embodiments of the present invention. However, according to the present invention, the implicit method or the explicit method may be applied to environments other than the above-described wireless communication environment.

When a base station transmitting a data channel differs from a base station transmitting a control channel as illustrated in FIG. 1, or when a plurality of base stations transmit a data channel as illustrated in FIG. 2, the reference signal arrangement of a base station transmitting the control channel may differ from the reference signal arrangement of a base station transmitting the data channel.

The reference signal arrangement may change according to the frequency shift of a reference signal, the number of reference signal antennas or ports, or whether a subframe in which a data channel is transmitted is a multicast-broadcast single frequency network (MBSFN) subframe or not.

A base station which transmits a control channel to a terminal may transmit MBSFN subframe information, as information on base stations transmitting a data channel, to a terminal. Here, the base station may transmit the MBSFN subframe information in the semi-static signaling method or the dynamic signaling method.

First, a method of transmitting the MBSFN subframe information through semi-static signaling is one in which a base station transmits the MBSFN subframe information to a terminal through semi-static signaling. For example, in the 3GPP system, semi-static signaling may be higher layer signaling or RRC signaling.

The MBSFN subframe information transmitted through the semi-static signaling method may become an MBSFN subframe pattern for a certain time. Here, it is assumed that a previous MBSFN subframe pattern is repeated until new MBSFN subframe information is transmitted to a terminal.

Base stations transmitting MBSFN subframe information are base stations relevant to the transmission of a data channel, and some of the base stations may not actually transmit the data channel to a terminal. For example, in the 3GPP system, the base stations may be a CoMP cooperating set.

A method of transmitting MBSFN subframe information through the dynamic signaling method includes defining a bit field representing the MBSFN subframe information in the payload of the allocation information control channel, and using the defined bit field.

In the dynamic signaling method, the MBSFN subframe information may consist of bitmap information indicating whether the subframe of each base station transmitting a data channel is an MBSFN subframe or not. Here, base stations transmitting the MBSFN subframe information are base stations that transmit a data channel to a terminal. For example, in the 3GPP system, the base stations may be the CoMP transmission set.

A downlink subframe may be configured by time-division-multiplexing a downlink physical control channel and a downlink physical data channel.

Figure 3:
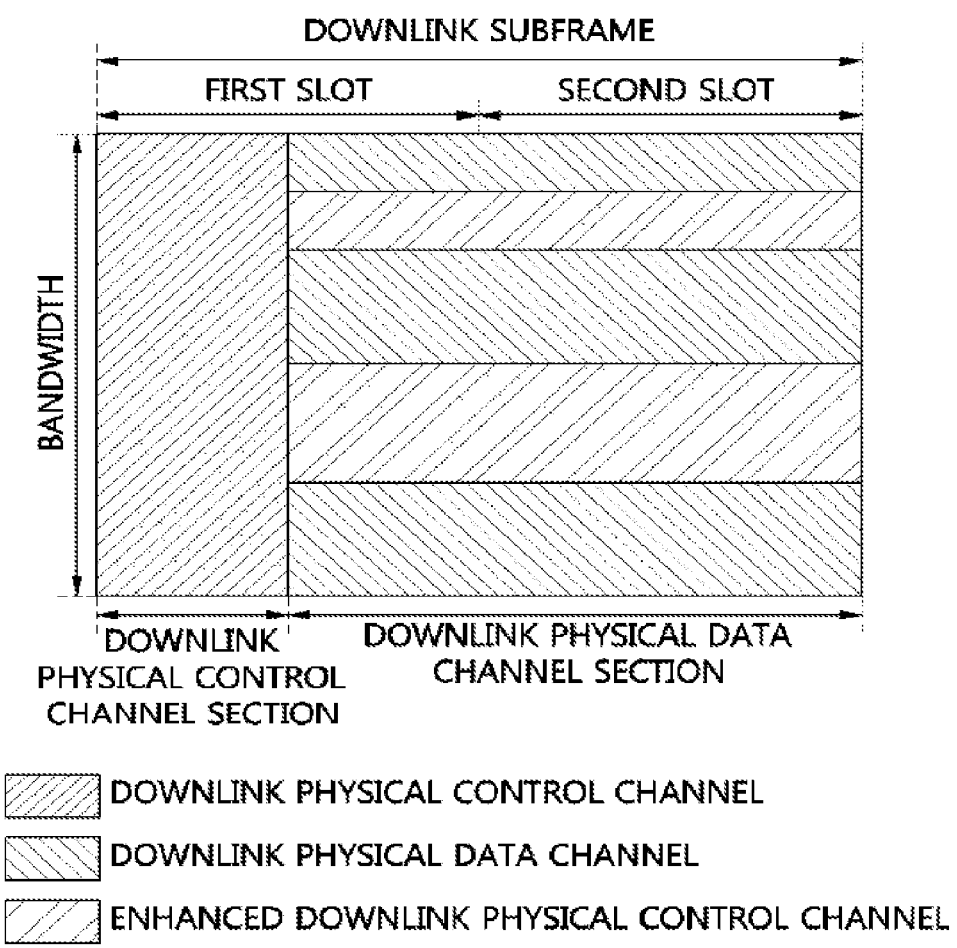
FIG. 3 is a conceptual diagram illustrating a configuration of a downlink subframe that is used in a method of transmitting and receiving a control channel according to an embodiment of the present invention.

FIG. 3 is a conceptual diagram illustrating a configuration of a downlink subframe that is used in a method of transmitting and receiving a control channel according to an embodiment of the present invention.

As illustrated in FIG. 3, the downlink subframe may be configured by time-division-multiplexing the downlink physical control channel and the downlink physical data channel, and an enhanced downlink physical control channel may be added into a downlink physical data channel section and transmitted. Hereinafter, the enhanced downlink physical control channel is referred to as an ePDCCH. In the 3GPP system, the downlink physical control channel may be a PDCCH.

One ePDCCH may consist of one enhanced control channel element or a plurality of enhanced control channel elements. Hereinafter, an enhanced control channel element is referred to as an eCCE. One eCCE may be configured with a plurality of resource elements. Here, a resource element is the same as the resource element, or RE, of the 3GPP system.

One virtual resource block pair may include a plurality of eCCEs. Also, one eCCE may be included in one virtual resource block. Here, the virtual resource block and the virtual resource block pair are the same as a virtual resource block (VRB) and a VRB pair in the 3GPP system, respectively.

FIGS. 4 to 10 are conceptual diagrams illustrating a configuration of an eCCE and a downlink demodulation reference signal when a plurality of eCCEs exist in one virtual resource block pair.

In FIGS. 4 to 10, it is assumed that the number of OFDM symbols of the downlink physical control channel is two, and the number of transmission antenna ports for a downlink cell-specific reference signal is four. An eCCE is transmitted from a position from which the downlink cell-specific reference signal is not transmitted in the eCCE of a subframe according to the number of transmission antenna ports for the downlink cell-specific reference signal.

Figure 4:
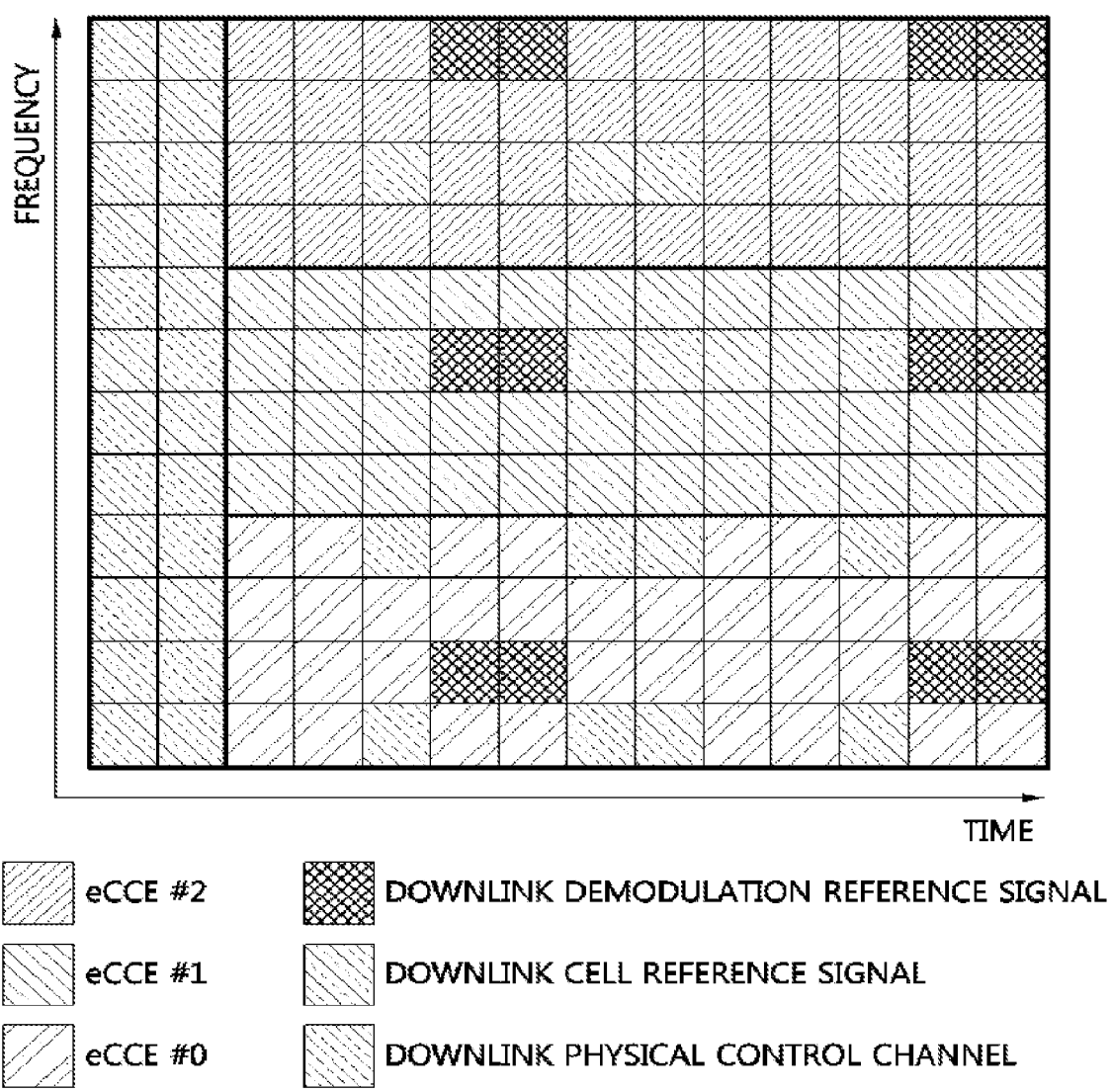
FIG. 4 is a conceptual diagram illustrating an example of a normal subframe applied to the method of transmitting and receiving a control channel according to an embodiment of the present invention.

FIG. 4 illustrates a configuration of an eCCE and a downlink demodulation reference signal when one downlink subframe consists of fourteen OFDM symbols and is a normal subframe, in a method of transmitting and receiving a control channel according to an embodiment of the present invention.

Moreover, FIG. 4 illustrates a configuration of an eCCE and a downlink demodulation reference signal when three eCCEs exist in one virtual resource block pair.

Figure 5:
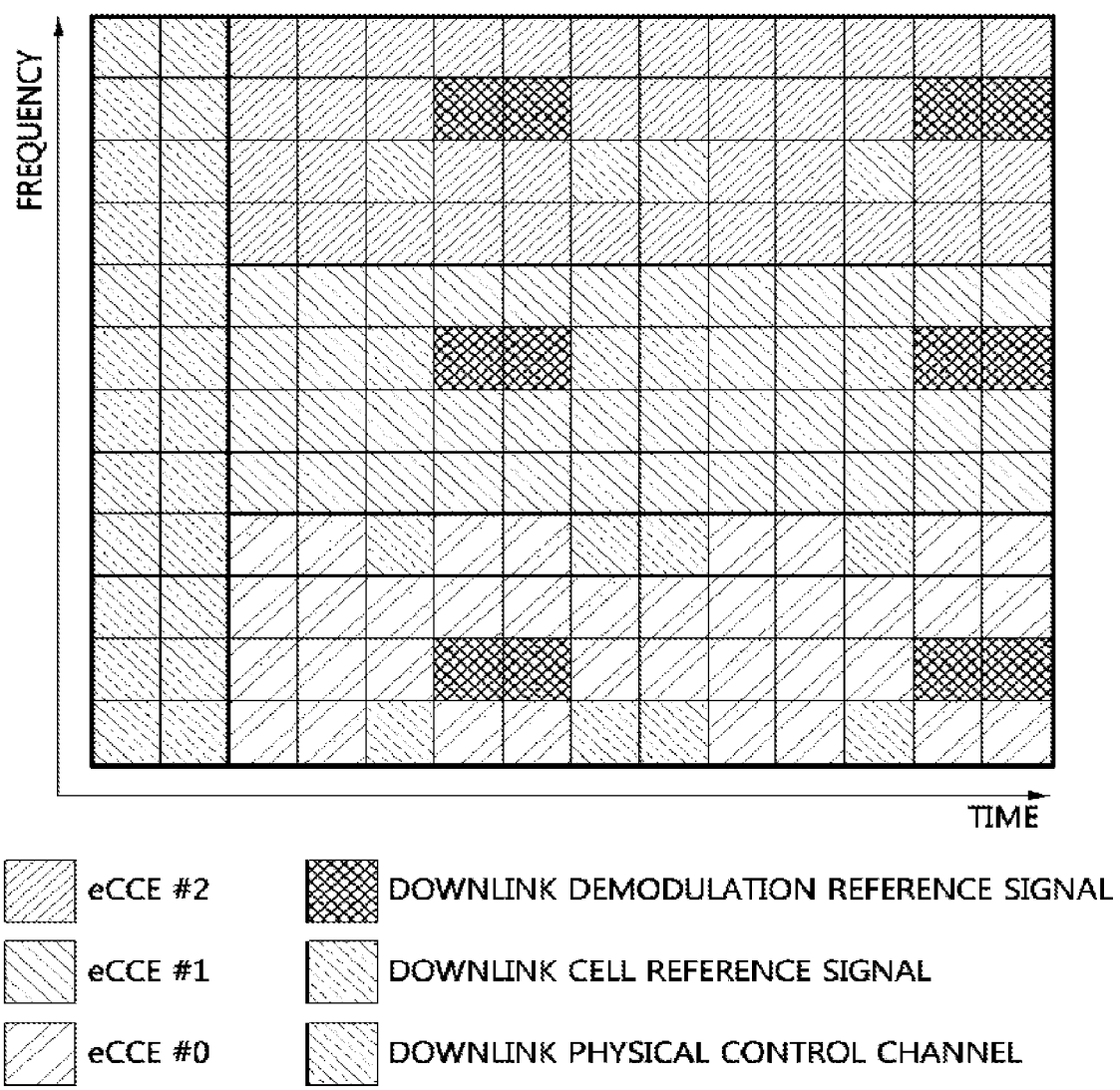
FIG. 5 is a conceptual diagram illustrating another example of a normal subframe applied to the method of transmitting and receiving a control channel according to an embodiment of the present invention.

FIG. 5 illustrates a configuration of an eCCE and a downlink demodulation reference signal when one downlink subframe consists of fourteen OFDM symbols and is a normal subframe, in a method of transmitting and receiving a control channel according to another embodiment of the present invention, and illustrates a configuration of an eCCE and a downlink demodulation reference signal when three eCCEs exist in one virtual resource block pair.

FIGS. 4 and 5 differ in position of the downlink demodulation reference signal on the frequency axis.

Figure 6:
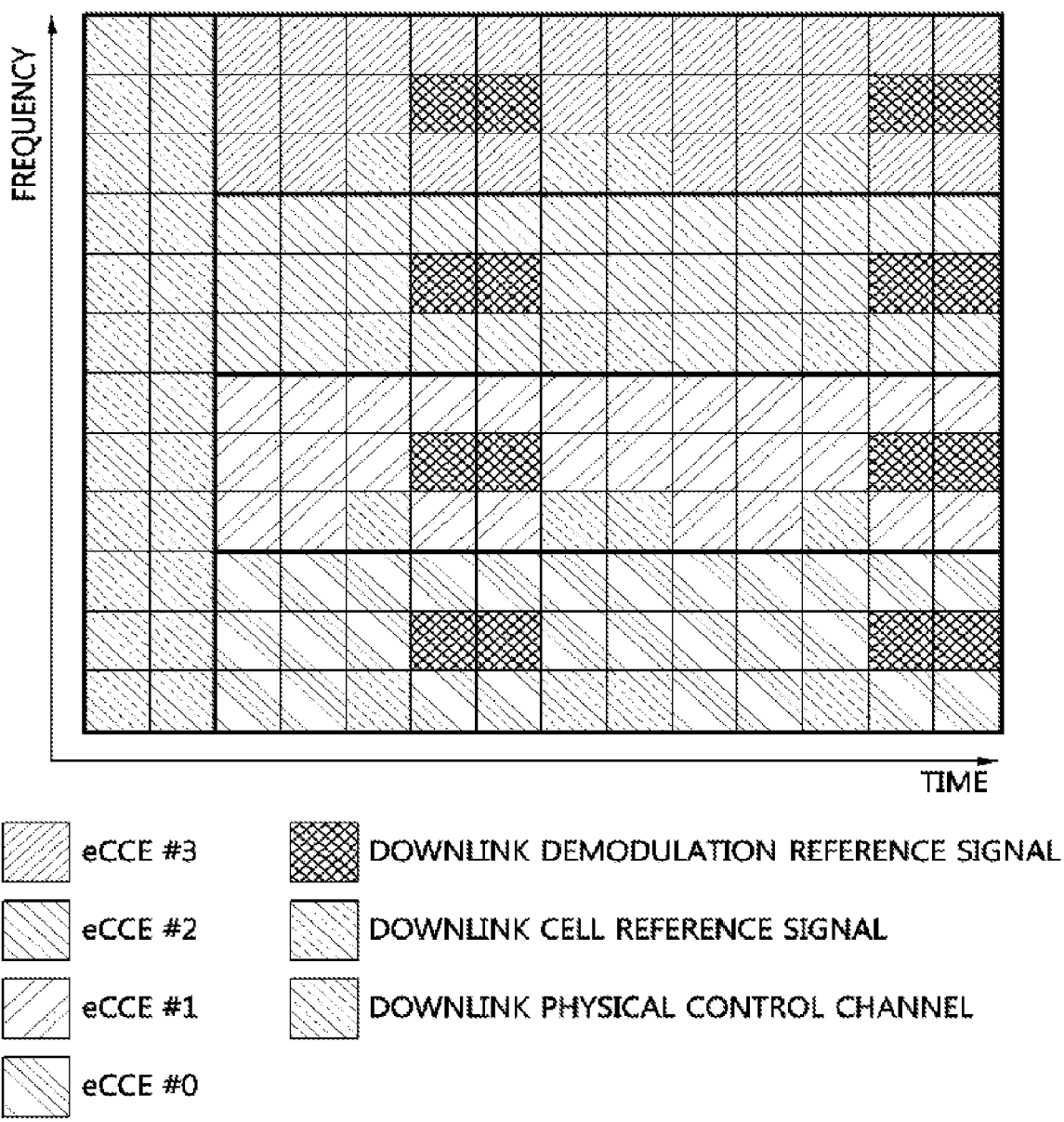
FIG. 6 is a conceptual diagram illustrating another example of a normal subframe applied to the method of transmitting and receiving a control channel according to an embodiment of the present invention.

FIG. 6 illustrates a configuration of an eCCE and a downlink demodulation reference signal when one downlink subframe consists of fourteen OFDM symbols and is a normal subframe, in a method of transmitting and receiving a control channel according to another embodiment of the present invention, and illustrates a configuration of an eCCE and a downlink demodulation reference signal when four eCCEs exist in one virtual resource block pair.

When the subframe of each of FIGS. 4 to 6 is an MBSFN subframe, a downlink cell-specific reference signal is not transmitted in each eCCE of FIGS. 4 to 6, and an eCCE is transmitted to the position of a downlink cell-specific reference signal.

Figure 7:
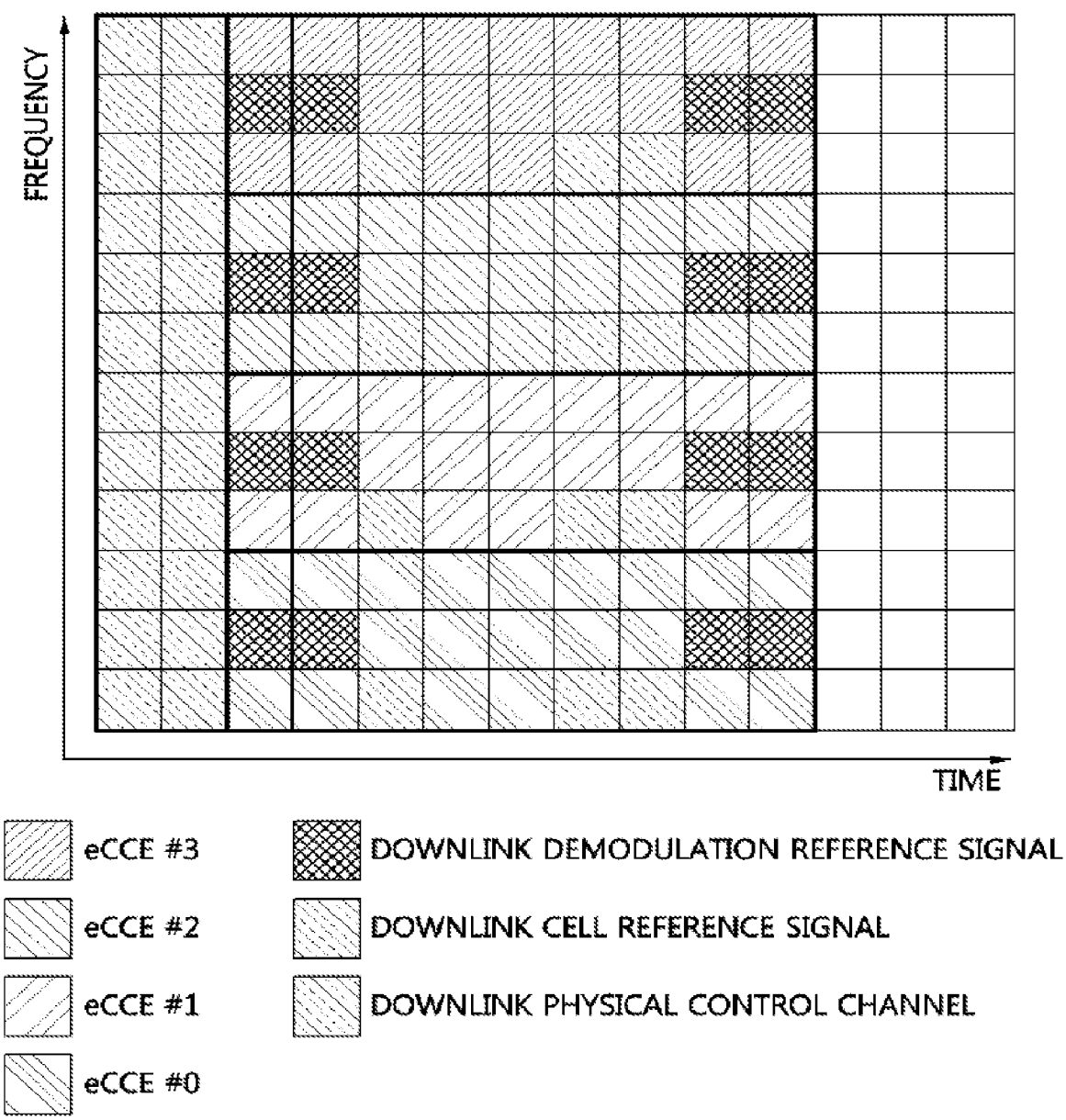
FIG. 7 is a conceptual diagram illustrating another example of a normal subframe applied to the method of transmitting and receiving a control channel according to an embodiment of the present invention.

FIG. 7 illustrates a configuration of an eCCE and a downlink demodulation reference signal when one downlink subframe consists of fourteen OFDM symbols and is a special subframe, in a method of transmitting and receiving a control channel according to another embodiment of the present invention.

As an example, FIG. 7 illustrates a configuration of an eCCE and a downlink demodulation reference signal when a downlink part (downlink pilot time slot (DwPTS)) is configured with eleven symbols among the fourteen OFDM symbols and includes four eCCEs.

Figure 8:
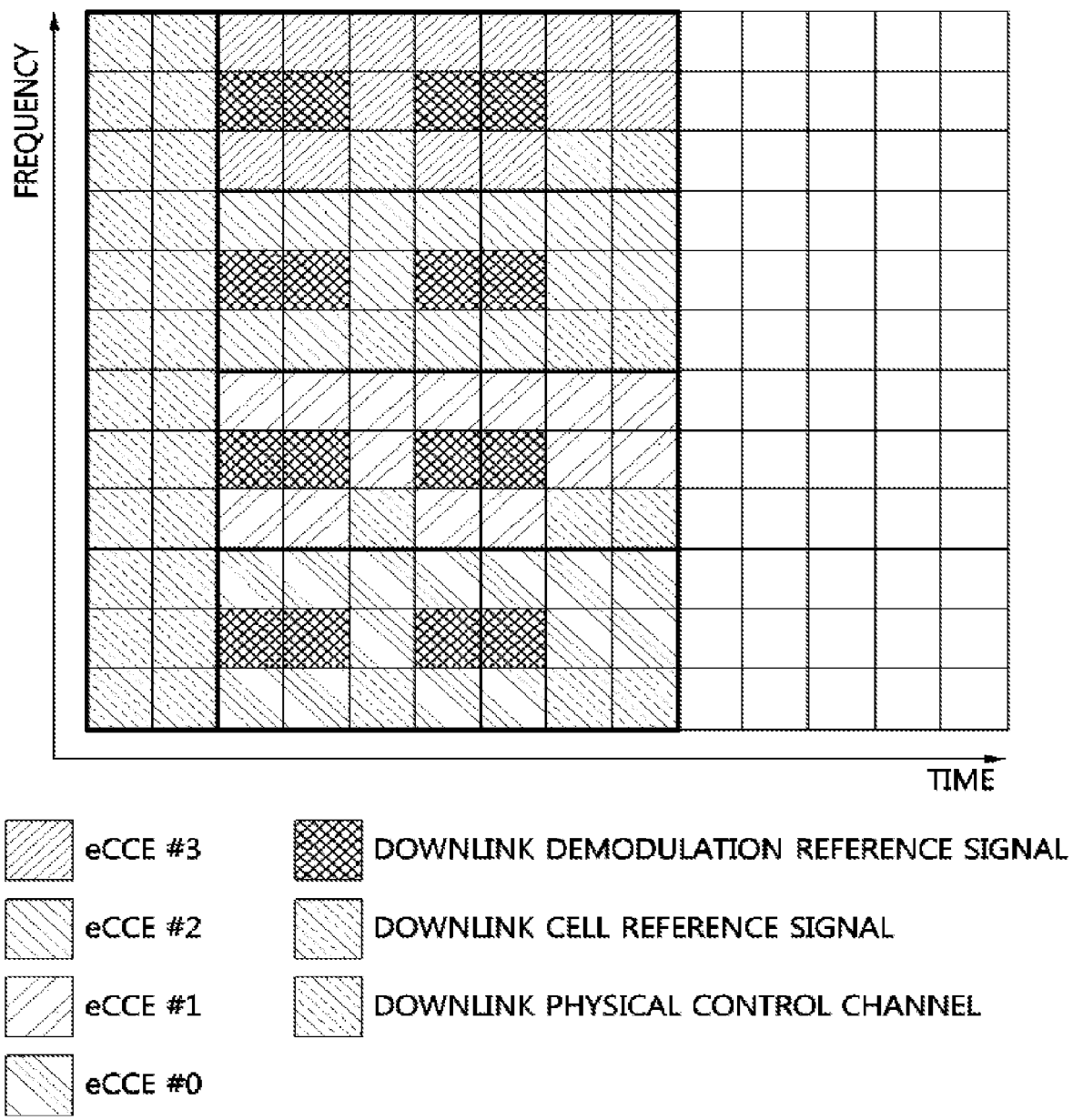
FIG. 8 is a conceptual diagram illustrating another example of a normal subframe applied to the method of transmitting and receiving a control channel according to an embodiment of the present invention.

FIG. 8 illustrates a configuration of an eCCE and a downlink demodulation reference signal when one downlink subframe consists of fourteen OFDM symbols and is a special subframe, in a method of transmitting and receiving a control channel according to another embodiment of the present invention.

As an example, FIG. 8 illustrates a configuration of an eCCE and a downlink demodulation reference signal when a downlink part (DwPTS) is configured with nine symbols among the fourteen OFDM symbols and includes four eCCEs.

Figure 9:
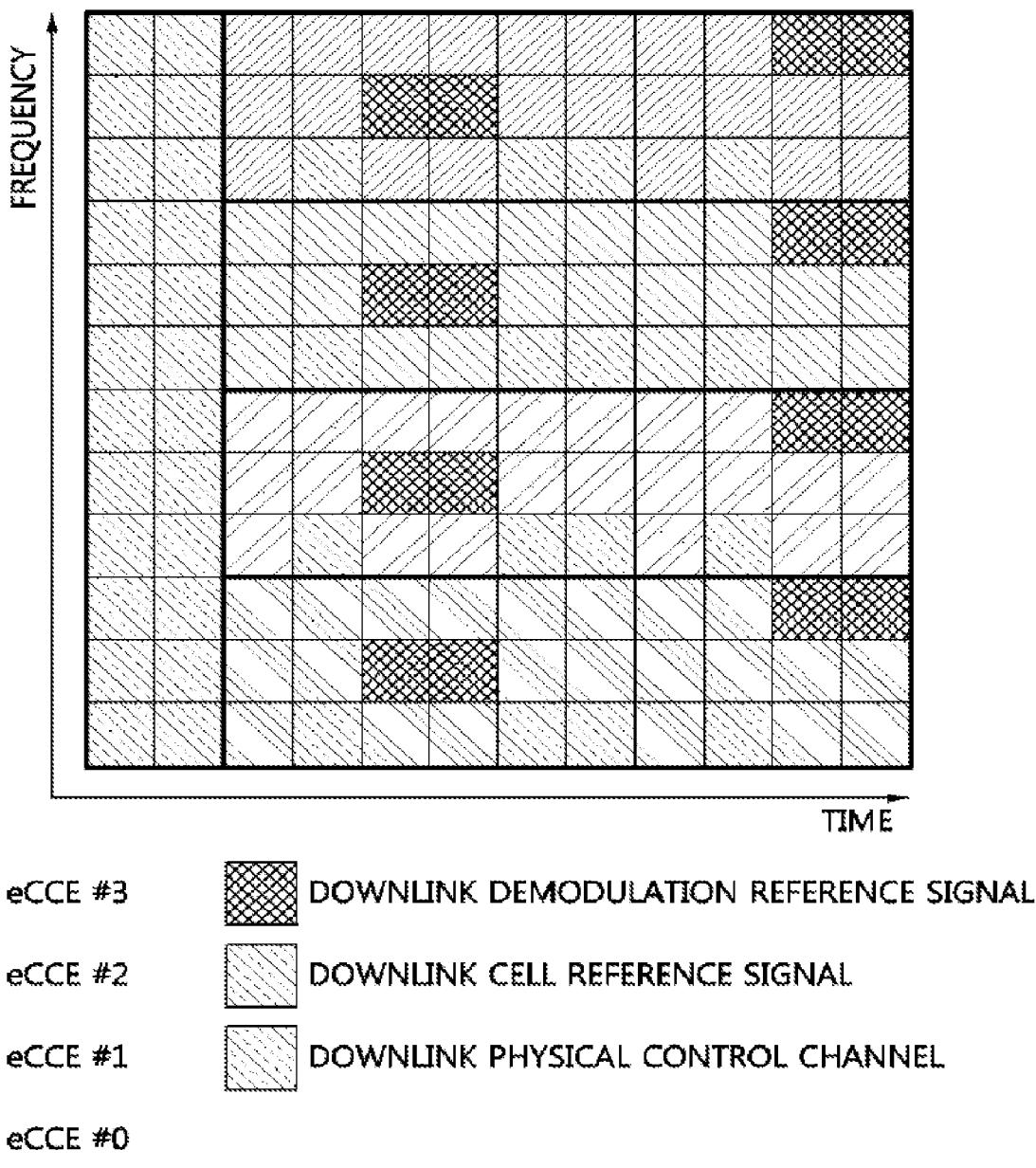
FIG. 9 is a conceptual diagram illustrating another example of a normal subframe applied to the method of transmitting and receiving a control channel according to an embodiment of the present invention.

FIG. 9 illustrates a configuration of an eCCE and a downlink demodulation reference signal when one downlink subframe consists of twelve OFDM symbols and is a normal subframe, in a method of transmitting and receiving a control channel according to another embodiment of the present invention, As an example, FIG. 9 illustrates a configuration of an eCCE and a downlink demodulation reference signal when four eCCEs exist in one virtual resource block pair. For example, when a subframe is an MBSFN subframe, the downlink cell-specific reference signal of FIG. 9 is not transmitted, and an eCCE is transmitted to the position of the downlink cell-specific reference signal.

Figure 10:
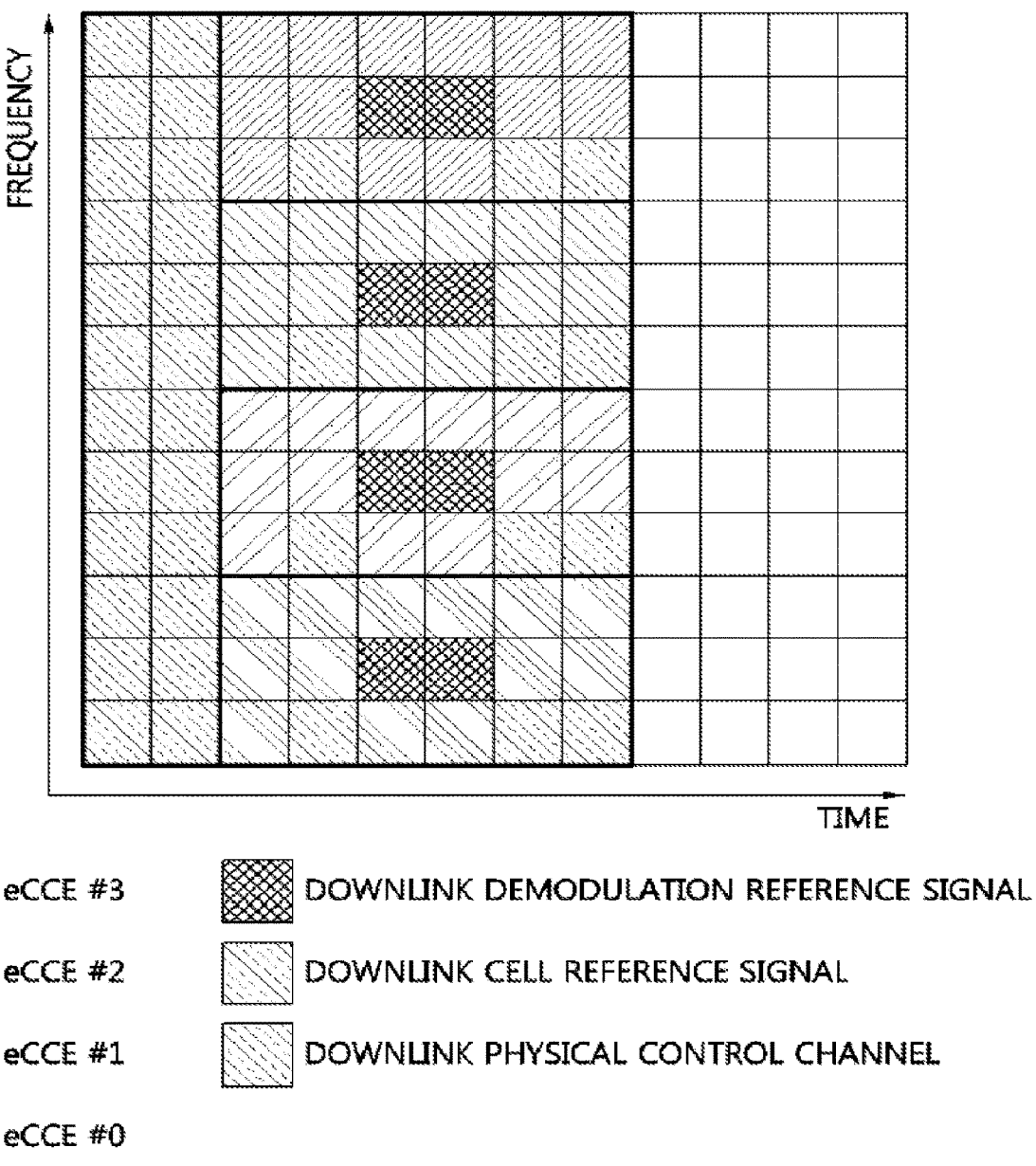
FIG. 10 is a conceptual diagram illustrating another example of a normal subframe applied to the method of transmitting and receiving a control channel according to an embodiment of the present invention.

FIG. 10 illustrates a configuration of an eCCE and a downlink demodulation reference signal when one downlink subframe consists of twelve OFDM symbols and is a special subframe, in a method of transmitting and receiving a control channel according to another embodiment of the present invention.

As an example, FIG. 10 illustrates a configuration of an eCCE and a downlink demodulation reference signal when a downlink part (DwPTS) of the special subframe is configured with eight symbols among the fourteen OFDM symbols, and the configuration of the eCCE and downlink demodulation reference signal may change according to the number of OFDM symbols configuring the downlink part.

In the above-described configuration of the subframe, when a subframe is a normal subframe or when a subframe is an MBSFN subframe, a zeropower channel state information reference signal (CSI-RS) and/or a non-zeropower channel state information reference signal (CSI-RS) may be disposed in an eCCE, in which case an eCCE is not transmitted from the position of the zeropower CSI-RS and/or the position of non-zeropower CSI-RS.

An ePDCCH may consist of one eCCE or a plurality of eCCEs. Hereinafter, the number of eCCEs configuring one ePDCCH is referred to as an aggregation level. For example, the aggregation level may consist of a set such as 1, 2, 4, 8 or the like. Hereinafter, a set of eCCEs that a terminal needs to search and that is a region in which ePDCCH candidates are transmittable is referred to as a search space.

The search space may change according to terminals or the aggregation level of an ePDCCH. Also, since the format of an ePDCCH is not known to a terminal in advance, the terminal may change the aggregation level to find an ePDCCH (which is transmitted from a base station) through blind decoding, and the number of blind decodings may vary according to the aggregation level.

The search space may be a localized type search space or a distributed type search space according to terminals. A base station may inform a terminal of whether the search space is the localized type search space or the distributed type search space through higher layer signaling for each terminal. In the 3GPP system, higher layer signaling for each terminal may be RRC signaling.

The localized type search space may be configured as follows, for obtaining a frequency selective scheduling gain.

First, in all aggregation levels (for example, 1, 2, 4, 8), each ePDCCH may consist of adjacent eCCEs. Such an operation may be performed by a base station. It is assumed by a terminal that the same precoding is applied to a plurality of eCCEs in each ePDCCH candidate. Also, the base station may set an eCCE-unit offset between ePDCCH candidates, and the offset may change according to aggregation level. Here, the offset may be a positive integer including zero.

Moreover, a base station may set an eCCE-unit offset for each terminal, for efficiently using the resource of the localized type search space. Here, the offset for each terminal may be a positive integer including zero.

When an aggregation level is L, $i_{offset,L}$ indicating the offset for each terminal may be expressed as Equation (4).

$$i_{offset,L} = (ID) \bmod K_{offset,L} \quad (4)$$

where ID denotes an identifier that a base station gives to a terminal. In the 3GPP system, the identifier (ID) is an RNTI, and may be a C-RNTI or an SPS C-RNTI. $K_{offset,L}$ denotes the number of offsets between ePDCCH candidates when an aggregation level is L, and may have different values according to the aggregation level "L".

A base station may inform each terminal of an offset for each terminal through higher layer signaling for each terminal. In the 3GPP system, higher layer signaling for each terminal may be RRC signaling. Also, the base station may set the same offset for each terminal or set different offsets according to aggregation level.

Higher layer signaling for each terminal may include an offset for each terminal by aggregation level, and the same offset for each terminal may be included in all aggregation levels. Here, an offset for each terminal may be zero according to aggregation level, and the offset for each terminal of an aggregation level whose offset for each terminal is zero may not be included in higher layer signaling for each terminal.

A base station may inform a terminal of one virtual resource block pair or virtual resource block through higher layer signaling for each terminal, in order for the terminal to determine a search space. Also, the base station may inform the terminal of one virtual resource block set consisting of a plurality of virtual resource blocks or a plurality of virtual resource block pairs through higher layer signaling for each terminal, in order for the terminal to determine the search space.

The mapping of the physical resource block of a virtual resource block may be based on a resource allocation type "0", a resource allocation type "1", and a resource allocation type "2" that are defined in the standard of the 3GPP system. In the 3GPP system, higher layer signaling for each terminal may be RRC signaling. When a base station may inform a terminal of one virtual resource block set consisting of a plurality of virtual resource blocks or a plurality of virtual resource block pairs through higher layer signaling for each terminal in order for the terminal to determine a search space, the localized type search space may be set as expressed in Equation (5).

$$n_{eCCE}^{ePDCCH} = (L \cdot (m \cdot K_{offset,L} + i_{offset,L}) + i) \bmod N \text{ where } i=0,1,\ldots,L-1 \text{ and } m=0,1,\ldots,M_L-1 \quad (5)$$

where $n_{eCCE}^{ePDCCH}$ denotes the index of an eCCE in which an ePDCCH candidate "m" having an aggregation level "L" is disposed. N denotes the number of eCCEs configuring one virtual resource block set that a base station transmits to a terminal, and an eCCE index in a virtual resource block set is 0, 1, ..., N−1. L denotes the aggregation level of an eCCE, m denotes the index of an ePDCCH candidate, and $i_{offset,L}$ denotes an offset for each terminal when an aggregation level is L. $K_{offset,L}$ denotes an offset between ePDCCH candidates when the aggregation level is L, and i denotes an eCCE index configuring an ePDCCH candidate having an aggregation level "L". Also, $M_L$ denotes the number of ePDCCH candidates having an aggregation level "L". As expressed in Equation (5), respective ePDCCH candidates may be transmitted to L number of successive eCCEs.

Alternatively, when a base station may inform a terminal of one virtual resource block pair or virtual resource block in order for the terminal to determine a search space, the localized type search space may be set as expressed in Equation (6).

$$n_{eCCE}^{ePDCCH} = (L \cdot (m \cdot K_{offset,L} + i_{offset,L}) + i) \text{ where } i=0,1,\ldots,L-1 \text{ and } m=0,1,\ldots,M_L-1 \quad (6)$$

where $n_{eCCE}^{ePDCCH}$ denotes the index of an eCCE in which an ePDCCH candidate "m" having an aggregation level "L" is disposed. One virtual resource block pair or virtual resource block of which a base station has informed a terminal corresponds to a position in which an eCCE "0" that is the lowest index in a search space is mapped, and a plurality of virtual resource blocks or virtual resource block pairs having the second greatest value after the index of the virtual resource block pair or virtual resource block of which the base station has informed the terminal configure a search space successively. An ePDCCH in which $i_{offset,L}=0$ and m=0 is transmitted to the virtual resource block pair or virtual resource block of which the base station has informed the terminal. L denotes the aggregation level of an eCCE, m denotes the index of an ePDCCH candidate, and $i_{offset,L}$ denotes an offset for each terminal when an aggregation level is L. $K_{offset,L}$ denotes an offset between ePDCCH candidates when the aggregation level is L, and i denotes an eCCE index configuring an ePDCCH candidate having an aggregation level "L". As expressed in Equation (6), respective ePDCCH candidates may be transmitted to L number of successive eCCEs.

FIGS. 11 to 14 are conceptual diagrams illustrating a configuration example of a localized type search space in a method of transmitting and receiving a control channel according to an embodiment of the present invention.

Figure 11:
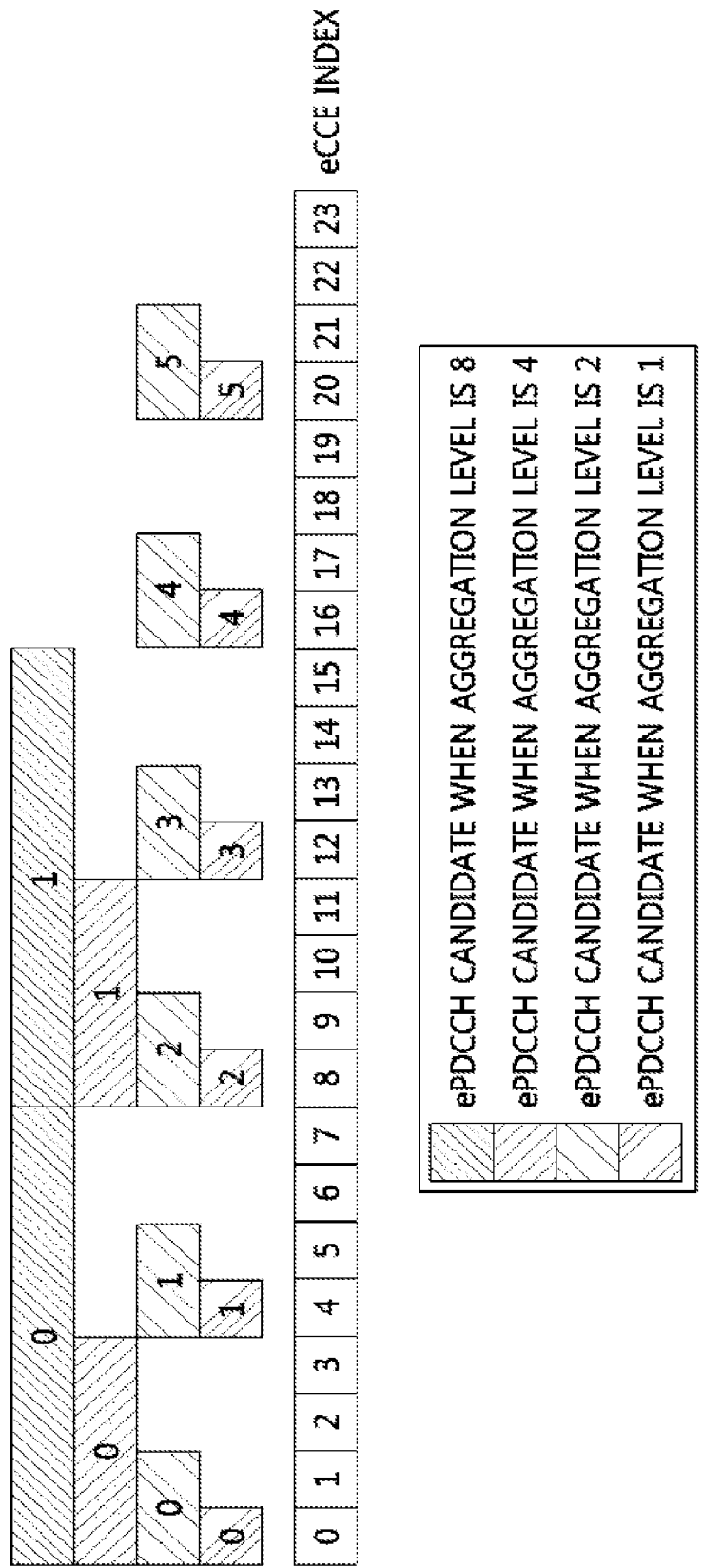
FIG. 11 is a diagram illustrating a configuration example of a localized type search space applied to the method of transmitting and receiving a control channel according to an embodiment of the present invention.

FIG. 11 is a diagram illustrating a configuration example of a localized type search space in a method of transmitting and receiving a control channel according to an embodiment of the present invention.

In FIG. 11, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=M_2=6$ and $M_4=M_8=2$. Offsets between ePDCCH candidates are assumed to be $K_{offset,1}=4$, $K_{offset,2}=K_{offset,4}=2$, and $K_{offset,8}=1$. An offset for each terminal is assumed to be $i_{offset,1}=i_{offset,2}=i_{offset,4}=i_{offset,8}=0$.

Figure 12:
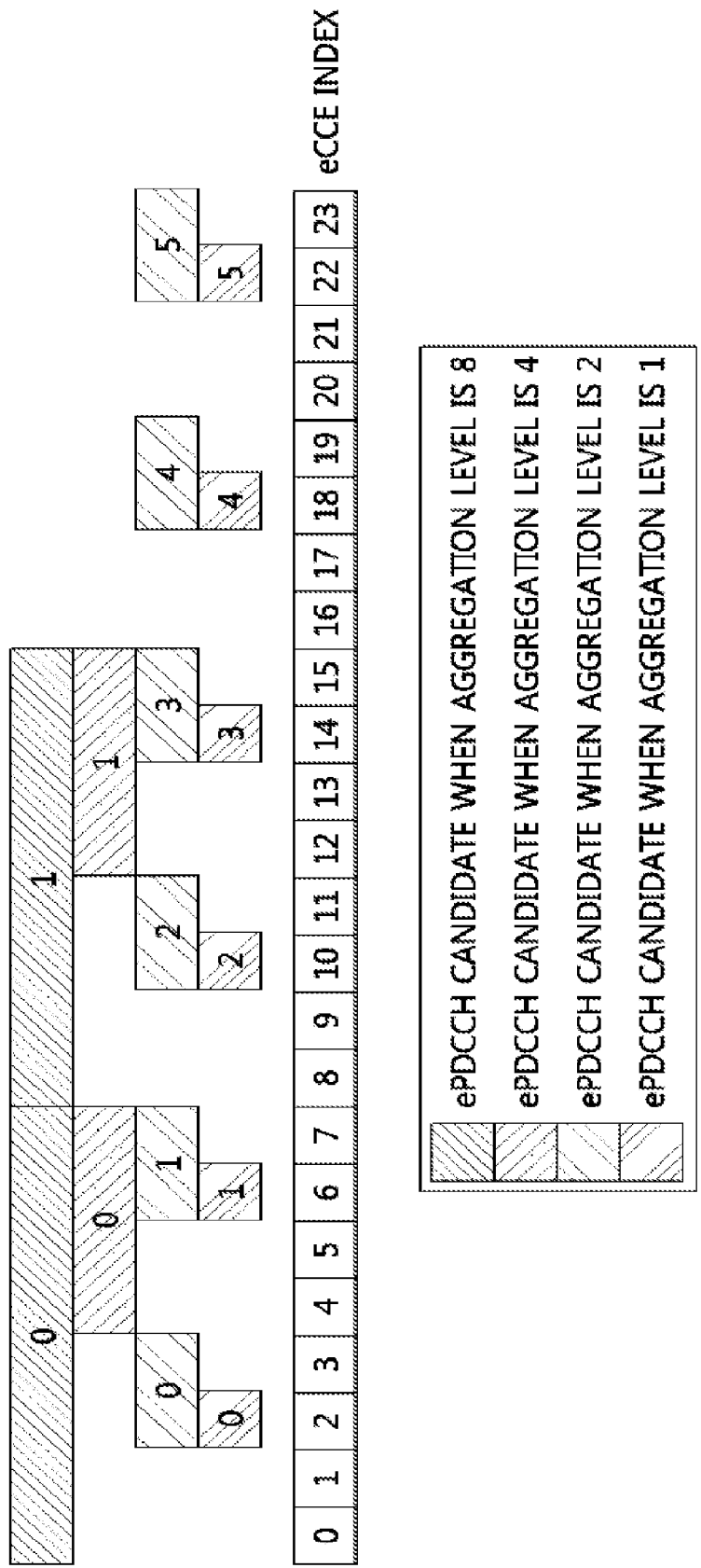
FIG. 12 is a diagram illustrating another configuration example of a localized type search space applied to the method of transmitting and receiving a control channel according to an embodiment of the present invention.

FIG. 12 is a diagram illustrating a configuration example of a localized type search space in a method of transmitting and receiving a control channel according to another embodiment of the present invention.

In FIG. 12, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=M_2=6$ and $M_4=M_8=2$. Offsets between ePDCCH candidates are assumed to be $K_{offset1}=4$, $K_{offset,2}=K_{offset,4}=2$, and $K_{offset,8}=1$. An offset for each terminal is assumed to be $i_{offset,1}=2$, $i_{offset,2}=i_{offset,4}=1$, and $i_{offset,8}=0$.

FIG. 13 is a diagram illustrating a configuration example of a localized type search space in a method of transmitting and receiving a control channel according to another embodiment of the present invention.

In FIG. 13, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=8$, $M_2=4$, and $M_4=M_8=2$. Offsets between ePDCCH candidates are assumed to be $K_{offset,1}=K_{offset,2}=K_{offset,4}=2$, and $K_{offset,8}=1$. An offset for each terminal is assumed to be $i_{offset,1}=i_{offset,2}=i_{offset,4}=i_{offset,8}=0$.

FIG. 14 is a diagram illustrating a configuration example of a localized type search space in a method of transmitting and receiving a control channel according to another embodiment of the present invention.

In FIG. 14, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=8$, $M_2=4$, and $M_4=M_8=2$. Offsets between ePDCCH candidates are assumed to be $K_{offset,1}=K_{offset,2}=K_{offset,4}=2$, and $K_{offset,8}=1$. An offset for each terminal is assumed to be $i_{offset,1}=i_{offset,2}=i_{offset,4}=1$, and $i_{offset,8}=0$.

The distributed type search space may be configured as follows, for obtaining a frequency diversity gain.

First, in all aggregation levels (for example, 1, 2, 4, 8), each ePDCCH may consist of distributed eCCEs that are not adjacent to one another. An eCCE-unit offset between a plurality of eCCEs configuring each ePDCCH candidate is necessary for configuring each ePDCCH candidate with distributed eCCEs, and the offset may change according to aggregation level. Here, the offset may be a positive integer including zero.

It is assumed by a terminal that different precodings are applied to a plurality of eCCEs included in each ePDCCH candidate.

Moreover, there may be an eCCE-unit offset between ePDCCH candidates, and the offset may change according to aggregation level. Here, the offset may be a positive integer including zero.

Moreover, there may be an eCCE-unit offset for each terminal, for efficiently using the distributed type search space. Here, the offset for each terminal may be a positive integer including zero. The offset for each terminal in the distributed type search space may be configured as expressed in Equation (4), as in the above-described offset for each terminal.

A base station may inform a terminal of an offset for each terminal through higher layer signaling for each terminal. In the 3GPP system, higher layer signaling for each terminal may be RRC signaling. Offsets for respective terminals may be the same or may differ. Higher layer signaling for each terminal may include an offset for each terminal by aggregation level, and the same one offset for each terminal may be included in all aggregation levels. An offset for each terminal may be zero according to aggregation level, and the offset for each terminal of an aggregation level whose offset for each terminal is zero may not be included in higher layer signaling for each terminal.

A base station may inform a terminal of one virtual resource block pair or virtual resource block through higher layer signaling for each terminal, in order for the terminal to determine a search space. Also, the base station may inform the terminal of one virtual resource block set consisting of a plurality of virtual resource blocks or a plurality of virtual resource block pairs through higher layer signaling for each terminal, in order for the terminal to determine the search space.

The mapping of the physical resource block of a virtual resource block may be based on a resource allocation type "0", a resource allocation type "1", and a resource allocation type "2" that are defined in the standard of the 3GPP system. In the 3GPP system, higher layer signaling for each terminal may be RRC signaling.

When a base station may inform a terminal of one virtual resource block set consisting of a plurality of virtual resource blocks or a plurality of virtual resource block pairs through higher layer signaling for each terminal in order for the terminal to determine a search space, the distributed type search space may be set as expressed in Equation (7).

$$n_{eCCE}^{ePDCCH}=(m \cdot K_{offset,L}+i_{offset,L}+i \cdot D_{offset,L}) \bmod N$$
$$\text{where } i=0,1,\ldots,L-1 \text{ and } m=0,1,\ldots,M_L-1 \quad (7)$$

where $n_{eCCE}^{ePDDCH}$ denotes the index of an eCCE in which an ePDCCH candidate "m" having an aggregation level "L" is disposed. N denotes the number of eCCEs configuring one virtual resource block set that a base station transmits to a terminal, and an eCCE index in a virtual resource block set is 0, 1, . . . , N−1. L denotes the aggregation level of an eCCE, and m denotes the index of an ePDCCH candidate. Also, $i_{offset,L}$ denotes an offset for each terminal when an aggregation level is L. $K_{offset,L}$ denotes an offset between ePDCCH candidates when the aggregation level is L.

$D_{offset,L}$ denotes an offset between a plurality of eCCEs in each ePDCCH candidate when an aggregation level is L. i denotes an eCCE index configuring an ePDCCH candidate having an aggregation level "L". Respective ePDCCH candidates may be transmitted to L number of distributed eCCEs.

Moreover, when a base station may inform a terminal of one virtual resource block pair or virtual resource block in order for the terminal to determine a search space, the distributed type search space may be set as expressed in Equation (8).

$$n_{eCCE}^{ePDCCH}=m \cdot K_{offset,L}+i_{offset,L}+i \cdot D_{offset,L} \text{ where }$$
$$i=0,1,\ldots,L-1 \text{ and } m=0,1,\ldots,M_{L-1} \quad (8)$$

where $n_{eCCE}^{ePDCCH}$ denotes the index of an eCCE in which an ePDCCH candidate "m" having an aggregation level "L" is disposed. One virtual resource block pair or virtual resource block of which a base station has informed a terminal corresponds to a position in which an eCCE "0" that is the lowest index in a search space is mapped, and a plurality of virtual resource blocks or virtual resource block pairs having the second greatest value after the index of the virtual resource block pair or virtual resource block of which the base station has informed the terminal configure a search space successively.

An ePDCCH in which $i_{offset,L}=0$ and m=0 is transmitted to the virtual resource block pair or virtual resource block of which the base station has informed the terminal. L denotes the aggregation level of an eCCE, m denotes the index of an ePDCCH candidate, and $i_{offset,L}$ denotes an offset for each terminal when an aggregation level is L. $K_{offset,L}$ denotes an offset between ePDCCH candidates when the aggregation level is L. Also, $D_{offset,L}$ denotes an offset between a plurality of eCCEs in each ePDCCH candidate when an aggregation level is L. i denotes an eCCE index configuring an ePDCCH candidate having an aggregation level "L". As expressed in Equation (8), respective ePDCCH candidates may be transmitted to L number of distributed eCCEs.

FIGS. 15 to 18 are conceptual diagrams illustrating a configuration example of a distributed type search space in a method of transmitting and receiving a control channel according to an embodiment of the present invention.

Figure 15:
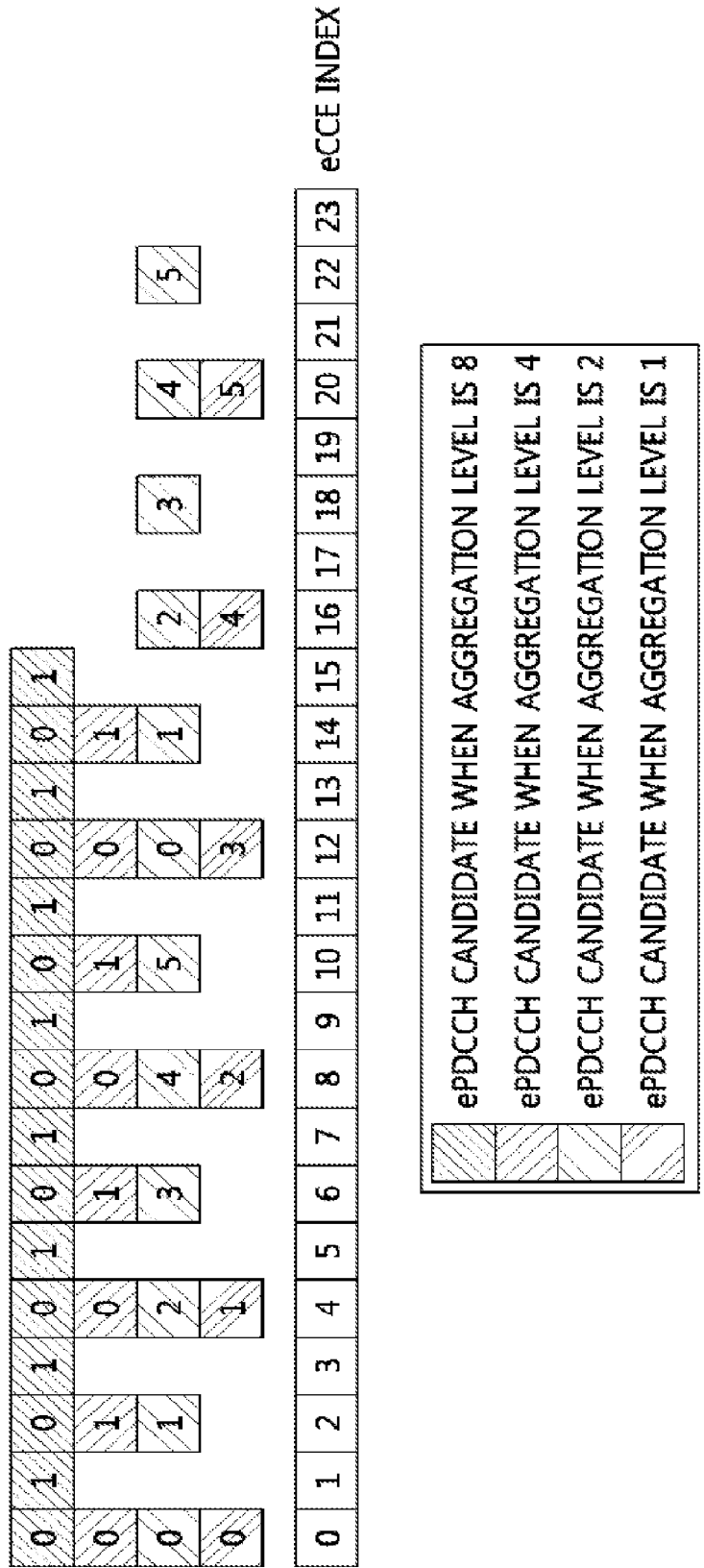
FIG. 15 is a diagram illustrating a configuration example of a distributed type search space applied to the method of transmitting and receiving a control channel according to an embodiment of the present invention.

FIG. 15 is a diagram illustrating a configuration example of a distributed type search space in a method of transmitting and receiving a control channel according to an embodiment of the present invention.

In FIG. 15, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=M_2=6$ and $M_4=M_8=2$. Offsets between ePDCCH candidates are assumed to be $K_{offset,1}=4$, $K_{offset,2}=K_{offset,4}=2$, and $K_{offset,8}=1$. Also, offsets between a plurality of eCCEs in an ePDCCH candidate are assumed to be $D_{offset,1}=1$, $D_{offset,2}=12$, $D_{offset,4}=4$, and $D_{offset,8}=2$, and an offset for each terminal is assumed to be $i_{offset,1}=i_{offset,2}=i_{offset,4}=i_{offset,8}=0$.

Figure 16:
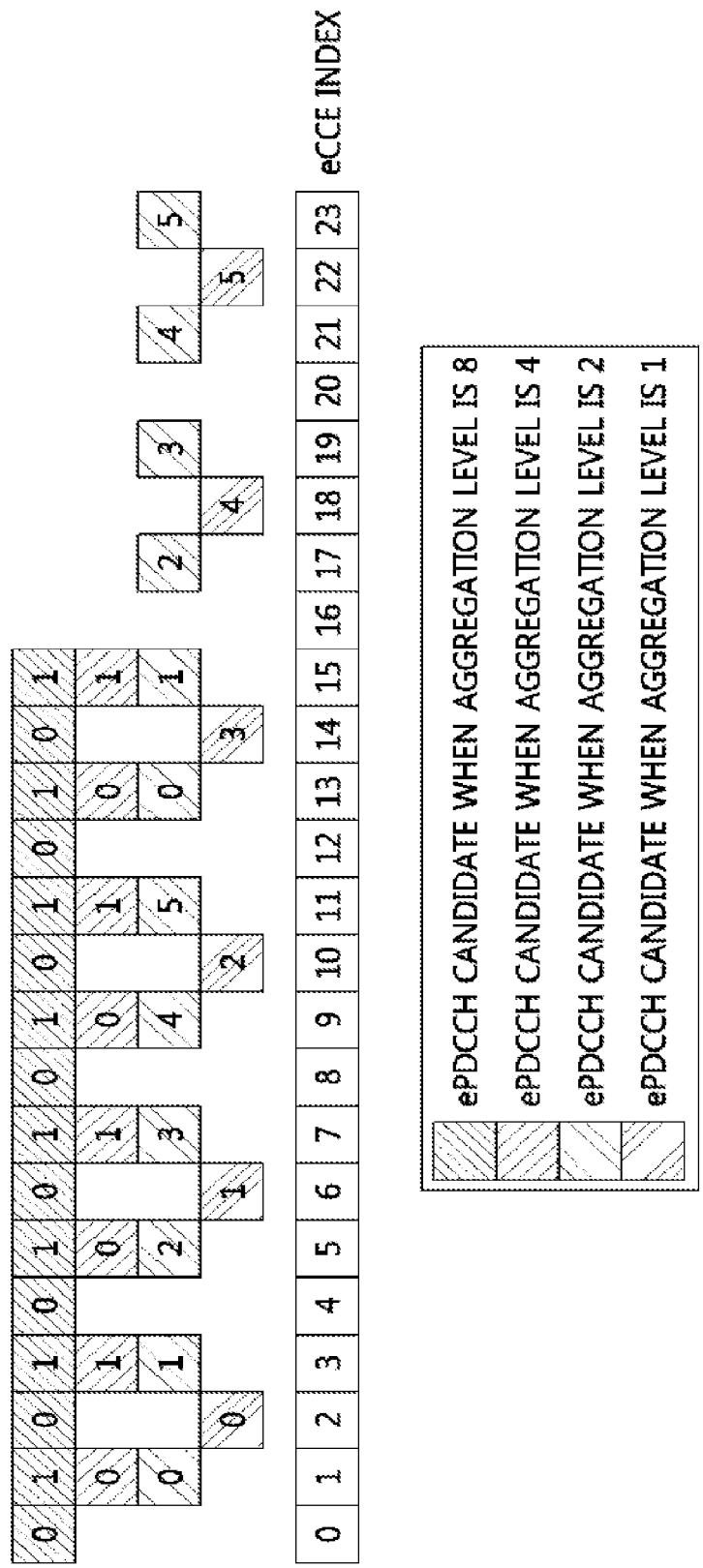
FIG. 16 is a diagram illustrating another configuration example of a distributed type search space applied to the method of transmitting and receiving a control channel according to an embodiment of the present invention.

FIG. 16 is a diagram illustrating a configuration example of a distributed type search space in a method of transmitting and receiving a control channel according to another embodiment of the present invention.

In FIG. 16, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=M_2=6$ and $M_4=M_8=2$. Offsets between ePDCCH candidates are assumed to be $K_{offset,1}=4$, $K_{offset,2}=K_{offset,4}=2$, and $K_{offset,8}=1$. Also, offsets between a plurality of eCCEs in an ePDCCH candidate are assumed to be $D_{offset,1}=1$, $D_{offset,2}=12$, $D_{offset,4}=4$, and $D_{offset,8}=2$, and an offset for each terminal is assumed to be $i_{offset,1}=2$, $i_{offset,2}=i_{offset,4}=1$, and $i_{offset,8}=0$.

FIG. 17 is a diagram illustrating a configuration example of a distributed type search space in a method of transmitting and receiving a control channel according to another embodiment of the present invention.

In FIG. 17, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=8$, $M_2=4$, and $M_4=M_8=2$. Offsets between ePDCCH candidates are assumed to be $K_{offset,1}=K_{offset,2}=K_{offset,4}=2$, and $K_{offset,8}=1$. Also, offsets between a plurality of eCCEs in an ePDCCH candidate are assumed to be $D_{offset,1}=1$, $D_{offset,2}=8$, $D_{offset,4}=4$, and $D_{offset,8}=2$, and an offset for each terminal is assumed to be $i_{offset,1}=i_{offset,2}=i_{offset,4}=i_{offset,8}=0$.

FIG. 18 is a diagram illustrating a configuration example of a distributed type search space in a method of transmitting and receiving a control channel according to another embodiment of the present invention.

In FIG. 18, the aggregation level of an eCCE is assumed to be L=1, 2, 4, and 8. In the drawing, a number illustrated in each ePDCCH candidate denotes the index "m" of each ePDCCH candidate. Also, the number of ePDCCH candidates is assumed to be $M_1=8$, $M_2=4$, and $M_4=M_8=2$. Offsets between ePDCCH candidates are assumed to be $K_{offset,1}=K_{offset,2}=K_{offset,4}=2$, and $K_{offset,8}=1$. Also, offsets between a plurality of eCCEs in an ePDCCH candidate are assumed to be $D_{offset,1}=1$, $D_{offset,2}=8$, $D_{offset,4}=4$, and $D_{offset,8}=2$, and an offset for each terminal is assumed to be $i_{offset,1}=i_{offset,2}=i_{offset,4}=1$, and $i_{offset,8}=0$.

As described above, the ePDCCH supports localized transmission and distributed transmission, but the downlink physical control channel supports only the distributed type. Also, the search space of a terminal may be divided into a terminal-common (UE-common) search space and a terminal-specific (UE-specific) search space. In the terminal-common search space a terminal may receive control information for a plurality of terminals, but in the terminal-specific search space a terminal may receive control information for one specific terminal.

In a legacy system capable of transmitting and receiving only the downlink physical control channel, a base station transmits the control information of the terminal-common search space and the control information of the terminal-specific search space through only the downlink physical control channel. On the other hand, in an enhanced system capable of transmitting and receiving the ePDCCH, a base station may transmit the control information of the terminal-common search space and the control information of the terminal-specific search space through the downlink physical control channel or the ePDCCH. Hereinafter, a terminal incapable of transmitting and receiving the ePDCCH is referred to as a legacy terminal, and a terminal capable of transmitting and receiving the ePDCCH is referred to as an enhanced terminal.

The enhanced system supports the legacy terminal as well as the enhanced terminal, and thus, in the enhanced system, a base station and a terminal may transmit and receive the downlink physical control channel.

A transmission type and a channel for transmitting the control information of a search space in the enhanced system in which the downlink physical control channel and the ePDCCH have been defined will be described in detail below. Also, an operation in which the enhanced terminal receives the control information of the search space will be described in detail.

In the terminal-common search space a terminal may receive common control information for both the enhanced terminal and the legacy terminal. Accordingly, a base station may transmit the common control information through the downlink physical control channel, for supporting the legacy terminal. Depending on system configuration and environment, the base station may not transmit the downlink physical control channel in a specific component carrier. Also, the base station may transmit the downlink physical control channel, but the enhanced terminal may not receive the downlink physical control channel. In this case, the base station may transmit the common control information through the ePDCCH, for the enhanced terminal. As described above, the enhanced terminal may or may not receive the downlink physical control channel depending on system configuration and environment.

A method in which the enhanced terminal receives a channel for transmitting the common control information may be largely categorized into three methods.

A first method is a method in which the enhanced terminal receives common control information through only the downlink physical control channel. A second method is a method in which the enhanced terminal receives common control information through only the ePDCCH. To this end, a base station may transmit the same common control information through the downlink physical control channel or the ePDCCH. A third method is a method in which a base station establishes a channel (downlink physical control channel or ePDCCH) through which common control information is received, to a terminal.

In the terminal-common search space a terminal may receive common control information for a plurality of terminals, and thus, distributed transmission is more effective than localized transmission. Accordingly, when a base station transmits the common control information through the ePDCCH, the ePDCCH may have a distributed type.

In the terminal-specific search space a terminal may receive two kinds of control information. One of the two kinds of control information is control information based on the transmission mode of a physical data channel, and the other is fallback control information irrelevant to the transmission mode of the physical data channel. For example, in the 3GPP system, the physical data channel may be a PDSCH or a PUSCH, and the fallback control information may be a downlink control information (DCI) format 1A or a DCI format 0.

A base station may transmit control information that is transmitted in the terminal-specific search space, through the downlink physical control channel or the ePDCCH. The downlink physical control channel enables distributed transmission, but the ePDCCH enables localized transmission or distributed transmission.

A transmission type effective for control information based on the transmission mode of the physical data channel may be the localized type or the distributed type according to the transmission mode of the physical data channel. A transmission type effective for the fallback control information is the distributed type in general, but may be the localized type depending on conditions.

A transmission scheme may be classified as shown in Table 4, according to the kinds of control information, the channels for transmitting the control information, and the transmission types of the channels through which the control information is transmitted.

All or some of the five transmission schemes classified in Table 4 may be defined in the enhanced system.

Hereinafter, a plurality of transmission schemes capable of being defined in the enhanced system will be described in detail.

The first transmission scheme is necessary when the enhanced terminal communicates with a base station for the legacy system, and thus may be included in the enhanced system.

The second transmission scheme uniquely has the distributed type using the ePDCCH, and thus may be included in the enhanced system.

The following three methods may be used for adding the third to fifth transmission schemes into the enhanced system.

In a first method, only the third and fourth transmission schemes are added into the enhanced system.

In a second method, only the fourth transmission scheme is added into the enhanced system.

In a third method, only the fifth transmission scheme is added into the enhanced system.

Here, in the first and second methods, the transmission types of channels for transmitting control information differ according to the kind of the control information (fallback control information or control information based on the physical data transmission mode). Accordingly, the terminal-specific search space may be divided into a search space for control information based on the physical data transmission mode, and a search space for the fallback control information. A base station may transmit resource block information, which configures each terminal-specific search space based on control information, to a terminal through higher layer signaling. In each of the search spaces, the number of blind decodings performed by the enhanced terminal may differ. For the ePDCCH, the number of blind decodings may be implicitly determined according to the size of a resource block configuring a search space.

Moreover, in the first method, the fallback control information may be transmitted through the downlink physical control channel or the ePDCCH, and thus, a base station may transmit establishment information on a channel, through which the fallback control information is transmitted, to a terminal through higher layer signaling.

The third method has only the ePDCCH-localized type as the transmission type of a channel through which control information is transmitted, irrespective of the kind of the control information. Accordingly, only one terminal-specific search space is required to be defined. A base station may transmit resource block information that configures the terminal-specific search space to a terminal through higher layer signaling.

While example embodiments of the present invention and their advantages have been described in detail, it should be

TABLE 4

| | Control information based on physical data transmission mode | Fallback control information |
|---|---|---|
| First transmission scheme | Downlink physical control channel-distributed type | Downlink physical control channel-distributed type |
| Second transmission scheme | ePDCCH-distributed type | ePDCCH-distributed type |
| Third transmission scheme | ePDCCH-localized type | Downlink physical control channel-distributed type |
| Fourth transmission scheme | ePDCCH-localized type | ePDCCH-distributed type |
| Fifth transmission scheme | ePDCCH-localized type | ePDCCH-localized type |

What is claimed is:

1. A communication method, comprising:
receiving, at a terminal, a first message, the first message comprising a first set of parameters and a second set of parameters, wherein the first set of parameters comprises first location information and the second set of parameters comprises a second location information;
receiving, at the terminal, control information through a Physical Downlink Control Channel (PDCCH) in a first subframe, the control information comprising an identifier to identify the first set of parameters;
determining, at the terminal, a starting Orthogonal Frequency Division Multiplexing (OFDM) symbol of a Physical Downlink Shared Channel (PDSCH) in the first subframe based on the first location information; and
receiving, at the terminal, data on the PDSCH in the first subframe.

2. The method of claim 1, wherein the identifier comprises a first number of bits designating the first set of parameters among four possible sets of parameters.

3. The method of claim 1, wherein the PDCCH is received from a first cell and the PDSCH is received from a second cell, the second cell being different from the first cell.

4. The method of claim 1, wherein the first set of parameters includes information related to a Multicast-Broadcast Single Frequency Network (MBSFN) subframe, and location information of reference signals.

5. The method of claim 1, wherein the first message is an RRC (Radio Resource Control) message.

6. The method of claim 1, wherein the first location information is different from the second location information.

7. A terminal, comprising:
a circuitry;
wherein the circuitry is configured to:
cause the terminal to receive a first message, the first message comprising a first set of parameters and a second set of parameters, wherein the first set of parameters comprises first location information and the second set of parameters comprises a second location information;
cause the terminal to receive control information through a Physical Downlink Control Channel (PDCCH) in a first subframe, the control information comprising an identifier to identify the first set of parameters;
determine a starting Orthogonal Frequency Division Multiplexing (OFDM) symbol of a Physical Downlink Shared Channel (PDSCH) in the first subframe based on the first location information; and
cause the terminal to receive data on the PDSCH in the first subframe.

8. The terminal of claim 7, wherein the identifier comprises a first number of bits designating the first set of parameters among four possible sets of parameters.

9. The terminal of claim 7, wherein the PDCCH is received from a first cell and the PDSCH is received from a second cell, the second cell being different from the first cell.

10. The terminal of claim 7, wherein the first set of parameters includes information related to a Multicast-Broadcast Single Frequency Network (MBSFN) subframe, and location information of reference signals.

11. The terminal of claim 7, wherein the first message is an RRC (Radio Resource Control) message.

12. The terminal of claim 7, wherein the first location information is different from the second location information.

13. A communication device for a terminal, the communication device comprising:
a circuitry;
wherein the circuitry is configured to:
cause the terminal to receive a first message, the first message comprising a first set of parameters and a second set of parameters, wherein the first set of parameters comprises first location information and the second set of parameters comprises a second location information;
cause the terminal to receive control information through a Physical Downlink Control Channel (PDCCH) in a first subframe, the control information comprising an identifier to identify the first set of parameters;
determine a starting Orthogonal Frequency Division Multiplexing (OFDM) symbol of a Physical Downlink Shared Channel (PDSCH) in the first subframe based on the first location information; and
cause the terminal to receive data on the PDSCH in the first subframe.

14. The communication device of claim 13, wherein the identifier comprises a first number of bits designating the first set of parameters among four possible sets of parameters.

15. The communication device of claim 13, wherein the PDCCH is received from a first cell and the PDSCH is received from a second cell, the second cell being different from the first cell.

16. The communication device of claim 13, wherein the first set of parameters includes information related to a Multicast-Broadcast Single Frequency Network (MBSFN) subframe, and location information of reference signals.

17. The communication device of claim 13, wherein the first message is an RRC (Radio Resource Control) message.

18. The communication device of claim 13, wherein the first location information is different from the second location information.

* * * * *